United States Patent
Shiner et al.

(10) Patent No.: US 11,082,157 B2
(45) Date of Patent: Aug. 3, 2021

(54) ASSESSING OPERATING CONDITIONS OF A RECEIVER IN A COMMUNICATION NETWORK BASED ON FORWARD ERROR CORRECTION DECODING PROPERTIES

(71) Applicants: Andrew D. Shiner, Ottawa (CA); Shahab Oveis Gharan, Ottawa (CA); Michael Hubbard, Ottawa (CA); Kim B. Roberts, Ottawa (CA)

(72) Inventors: Andrew D. Shiner, Ottawa (CA); Shahab Oveis Gharan, Ottawa (CA); Michael Hubbard, Ottawa (CA); Kim B. Roberts, Ottawa (CA)

(73) Assignee: CIENA CORPORATION, Hanover, MD (US)

(*) Notice: Subject to any disclaimer, the term of this patent is extended or adjusted under 35 U.S.C. 154(b) by 42 days.

(21) Appl. No.: 16/666,520

(22) Filed: Oct. 29, 2019

(65) Prior Publication Data
US 2021/0126734 A1     Apr. 29, 2021

(51) Int. Cl.
*H04L 1/00*        (2006.01)
*H04W 24/08*   (2009.01)

(52) U.S. Cl.
CPC ............ *H04L 1/005* (2013.01); *H04L 1/0002* (2013.01); *H04L 1/0057* (2013.01); *H04W 24/08* (2013.01)

(58) Field of Classification Search
None
See application file for complete search history.

(56) References Cited

U.S. PATENT DOCUMENTS

| 5,896,391 | A  | 4/1999  | Solheim et al. |
| 7,457,538 | B2 | 11/2008 | Strawczynski et al. |
| 7,561,797 | B1 | 7/2009  | Harley et al. |

(Continued)

FOREIGN PATENT DOCUMENTS

| FR | 2747255 | 10/1997 |
| FR | 2753026 | 3/1998 |

OTHER PUBLICATIONS

Acacia Communications, et al., "OFEC description", CD11-E0X, SG15 Q11, 2018.
Arikan, "A performance comparison of polar codes and Reed-Muller codes", IEEE Commun. Lett., vol. 12, Issue 6, 2008.

(Continued)

*Primary Examiner* — Yaotang Wang
(74) *Attorney, Agent, or Firm* — Integral Intellectual Property Inc.; Amy Scouten; Miriam Paton

(57) ABSTRACT

A system is configured to measure a forward error correction (FEC) decoding property associated with applying FEC decoding to FEC-encoded bits or symbols at a receiver device deployed in a communication network. The system is further configured to provide an assessment of operating conditions of the receiver device based on the FEC decoding property. In one example, the FEC decoding property comprises a distribution of a number of iterations of a FEC decoding operation applied to a plurality of FEC blocks processed within a period of time. In some examples, the FEC decoding property comprises any one of heat, temperature, current, voltage, active clock cycles, idle clock cycles, activity of parallel engines, activity of pipeline stages, and input or output buffer fill level of the FEC decoding. In some examples, the assessment is based on a comparison between the FEC decoding property and reference FEC data.

7 Claims, 8 Drawing Sheets

(56) References Cited

U.S. PATENT DOCUMENTS

| | | | |
|---|---|---|---|
| 8,230,294 B2 | 7/2012 | Roberts et al. | |
| 8,594,499 B1 | 11/2013 | Roberts et al. | |
| 9,088,387 B2 | 7/2015 | Oveis Gharan et al. | |
| 9,438,369 B2 | 9/2016 | Swinkels et al. | |
| 10,200,149 B2 | 2/2019 | Roberts et al. | |
| 2003/0016695 A1* | 1/2003 | Sabet | H04L 1/0045 370/465 |
| 2006/0008279 A1* | 1/2006 | Chiang | H04B 10/6971 398/202 |
| 2009/0256622 A1 | 10/2009 | Roberts | |
| 2015/0095726 A1 | 4/2015 | Cameron et al. | |
| 2019/0081730 A1 | 3/2019 | Oveis Gharan et al. | |
| 2019/0190648 A1 | 6/2019 | Reimer et al. | |
| 2019/0190651 A1 | 6/2019 | Oveis Gharan et al. | |

OTHER PUBLICATIONS

Schmalen, et al. "Performance prediction of nonbinary forward error correction in optical transmission experiments", Journal of Lightwave Technology, vol. 35, Issue 4, 2017.

Garrammone. "International Search Report for PCT/IB2020/059119", dated Feb. 10, 2021.

Garrammone. "Written Opinion of the International Search Authority for PCT/IB2020/059119", dated Feb. 10, 2021.

Abdelhedi, et al. "Iterative decoding algorithms of LDPC codes using TAP approach", Information Infrastructure Symposium, 2009, IEEE, Jun. 23, 2009.

Sweatlock et al. "Buffering requirements for variable-iterations LDPC decoders", Information Theory and Applications Workshop, 2008, IEEE, Jan. 27, 2008.

\* cited by examiner

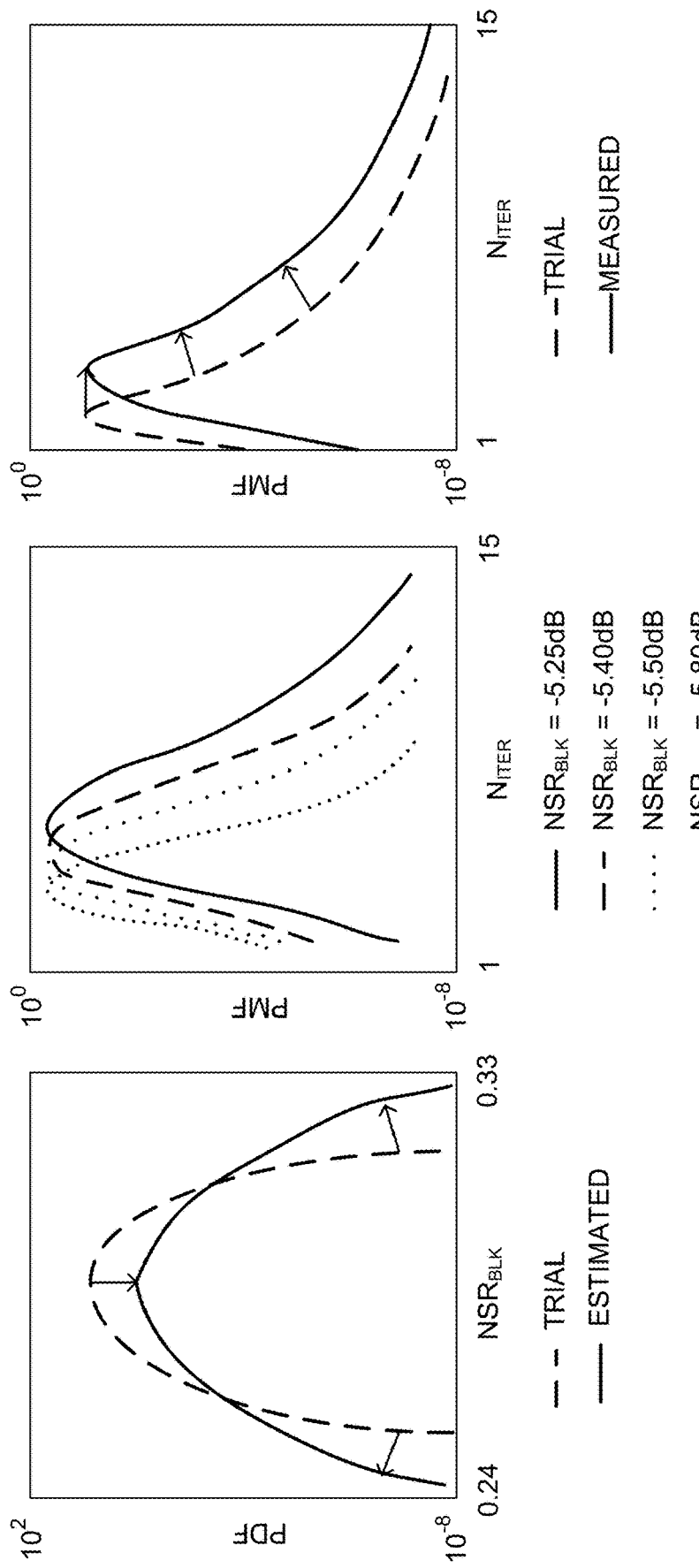

ASSESSING OPERATING CONDITIONS OF A RECEIVER IN A COMMUNICATION NETWORK BASED ON FORWARD ERROR CORRECTION DECODING PROPERTIES

TECHNICAL FIELD

This document relates to the technical field of communications.

BACKGROUND

In a communication network, a transmitter may transmit a signal over a communication channel to a receiver, where the signal is representative of digital information in the form of bits or symbols. The receiver may process the signal received over the communication channel to recover estimates of the bits or symbols. The received signal may comprise a degraded version of the signal that was generated at the transmitter. Various components of the communication network may contribute to signal degradation.

The amount of signal degradation may be characterized by signal-to-noise ratio (SNR), or alternatively by noise-to-signal ratio (NSR). A high NSR may result in erroneous estimates of the bits. The probability that bit estimates recovered at the receiver differ from the original bits encoded at the transmitter may be characterized by the Bit Error Ratio or Bit Error Rate (BER).

Forward Error Correction (FEC) techniques may be used to reduce the BER. The original bits of information from the client (referred to as client bits) may undergo a FEC encoding operation based on a chosen FEC scheme. The resulting FEC-encoded bits include redundant information, such as parity or check bits. The bit estimates recovered at the receiver are estimates of the FEC-encoded bits that were generated at the transmitter. These estimates may undergo a FEC decoding operation at the receiver based on the chosen FEC scheme. The FEC decoding operation makes use of the redundant information that was included in the FEC-encoded bits in order to detect and correct bit errors. Ultimately, estimates of the original client bits may be recovered from the FEC-decoded bit estimates.

FEC encoding is advantageous in that it acts to reduce the received BER without the need to resend data packets. However, this is at the cost of an increased overhead. The amount of overhead or redundancy added by FEC encoding may be characterized by the information rate R, where R is defined as the ratio of the length of the input data sequence to the length of the output data sequence after FEC encoding (which includes the overhead). For example, if FEC encoding adds 25% overhead, then for every four bits that are to be FEC-encoded, the FEC encoding will add 1 bit of overhead, resulting in 5 FEC-encoded bits to be transmitted to the optical receiver. This corresponds to an information rate R=4/5=0.8.

SUMMARY

According to a broad aspect, a system comprises circuitry configured to measure an indirect forward error correction (FEC) decoding property associated with applying FEC decoding to FEC-encoded bits or symbols at a receiver device deployed in a communication network, the FEC-encoded bits or symbols having been encoded using FEC encoding corresponding to the FEC decoding. The system further comprises circuitry configured to provide an assessment of operating conditions of the receiver device based on the indirect FEC decoding property.

According to some examples, the indirect FEC decoding property comprises a number of iterations of a FEC decoding operation applied to one or more FEC blocks at the receiver device while the receiver device is deployed in the communication network, each of the FEC blocks comprising a plurality of the FEC-encoded bits or symbols.

According to some examples, the indirect FEC decoding property comprises a distribution of the number of iterations of the FEC decoding operation applied to each of a plurality of the FEC blocks processed within a period of time.

According to some examples, the indirect FEC decoding property comprises any one of heat, temperature, current, voltage, active clock cycles, idle clock cycles, activity of parallel engines, activity of pipeline stages, input buffer fill level of the FEC decoding, and output buffer fill level of the FEC decoding.

According to some examples, the system comprises circuitry configured to store reference FEC data, and the assessment is based on a comparison between the indirect FEC decoding property and the reference FEC data.

According to some examples, the reference FEC data comprises one or more masks.

According to some examples, the reference FEC data is based on a reference FEC decoding property associated with application of the FEC decoding under predefined noise conditions.

According to some examples, the assessment of the operating conditions comprises classification of the receiver device into at least one of one or more predefined categories.

According to some examples, the receiver device comprises the circuitry configured to measure the indirect FEC decoding property, and the system comprises a controller device, wherein the controller device comprises circuitry configured to initiate a change in one or more parameters of the communication network based on the assessment of the operating conditions of the receiver device.

According to some examples, the parameters of the communication network comprise one or more of data rate, launch power, transmission distance, channel spacing, add-drop filter configuration, and network routing.

According to some examples, the controller device comprises the circuitry configured to provide the assessment of the operating conditions of the receiver device.

According to some examples, providing the assessment comprises one or more of storing assessment results at one or more electronic devices in the communication network, transmitting assessment results from one electronic device in the communication network to another electronic device in the communication network, and displaying assessment results on a display screen of at least one electronic device in the communication network.

According to another broad aspect, an electronic device comprises circuitry configured to store a measured FEC iteration distribution of a number of iterations of a FEC decoding operation applied to each of a plurality of FEC blocks processed, within a period of time, at a receiver device deployed in a communication network, each FEC block consisting of FEC-encoded bits or symbols encoded using a FEC encoding operation corresponding to the FEC decoding operation. The electronic device further comprises circuitry configured to store a series of reference FEC iteration distributions, each reference FEC iteration distribution comprising a distribution of a number of iterations of the FEC decoding operation applied to FEC blocks under different predefined noise conditions. The electronic device further comprises circuitry configured to calculate, based on the measured FEC iteration distribution and the series of reference FEC iteration distributions, an estimate of a noise distribution over the plurality of FEC blocks prior to application of the FEC decoding operation.

According to some examples, the electronic device comprises circuitry configured to calculate a trial FEC iteration distribution by combining a trial noise distribution having trial parameters with the series of reference FEC iteration distributions, and circuitry configured to calculate the estimate of the noise distribution by determining the trial parameters which minimize a difference between the trial FEC iteration distribution and the measured FEC iteration distribution.

According to some examples, the electronic device comprises circuitry configured to calculate a modified noise distribution based on the estimate of the noise distribution and an additional predefined noise distribution, and circuitry configured to calculate a predicted FEC iteration distribution based on the modified noise distribution and the series of reference FEC iteration distributions.

According to some examples, the electronic device comprises circuitry configured to provide an assessment of a predicted change in operating conditions of the receiver device based on the predicted FEC iteration distribution.

According to some examples, the electronic device comprises circuitry configured to initiate a change in one or more parameters of the communication network based on the assessment.

According to another broad aspect, an electronic device comprises circuitry configured to store a test noise distribution over a plurality of FEC blocks, each FEC block consisting of FEC-encoded bits or symbols encoded using a FEC encoding operation. The electronic device further comprises circuitry configured to store a series of reference FEC iteration distributions, each reference FEC iteration distribution comprising a distribution of a number of iterations of a FEC decoding operation applied to FEC blocks under different predefined noise conditions, the FEC decoding operation corresponding to the FEC encoding operation. The electronic device further comprises circuitry configured to calculate a predicted FEC iteration distribution based on the test noise distribution and the series of reference FEC iteration distributions.

According to some examples, the electronic device comprises circuitry configured to provide an assessment of predicted operating conditions of a receiver device based on the predicted FEC iteration distribution.

According to some examples, the electronic device comprises circuitry configured to initiate a change in one or more parameters of a communication network based on the assessment.

BRIEF DESCRIPTION OF THE DRAWINGS

FIG. 7 illustrates an example trial noise probability density function (PDF) and an estimated noise PDF over a plurality of FEC blocks in accordance with some examples of the technology disclosed herein;

FIG. 8 illustrates a series of reference FEC iteration PMFs, each PMF associated with application of a FEC decoding operation under a different predefined condition;

FIG. 9 illustrates an example measured FEC iteration PMF and a trial FEC iteration PMF calculated using the trial noise PDF illustrated in FIG. 7 and the series of reference FEC iteration PMFs illustrated in FIG. 8;

DETAILED DESCRIPTION

Figure 1:
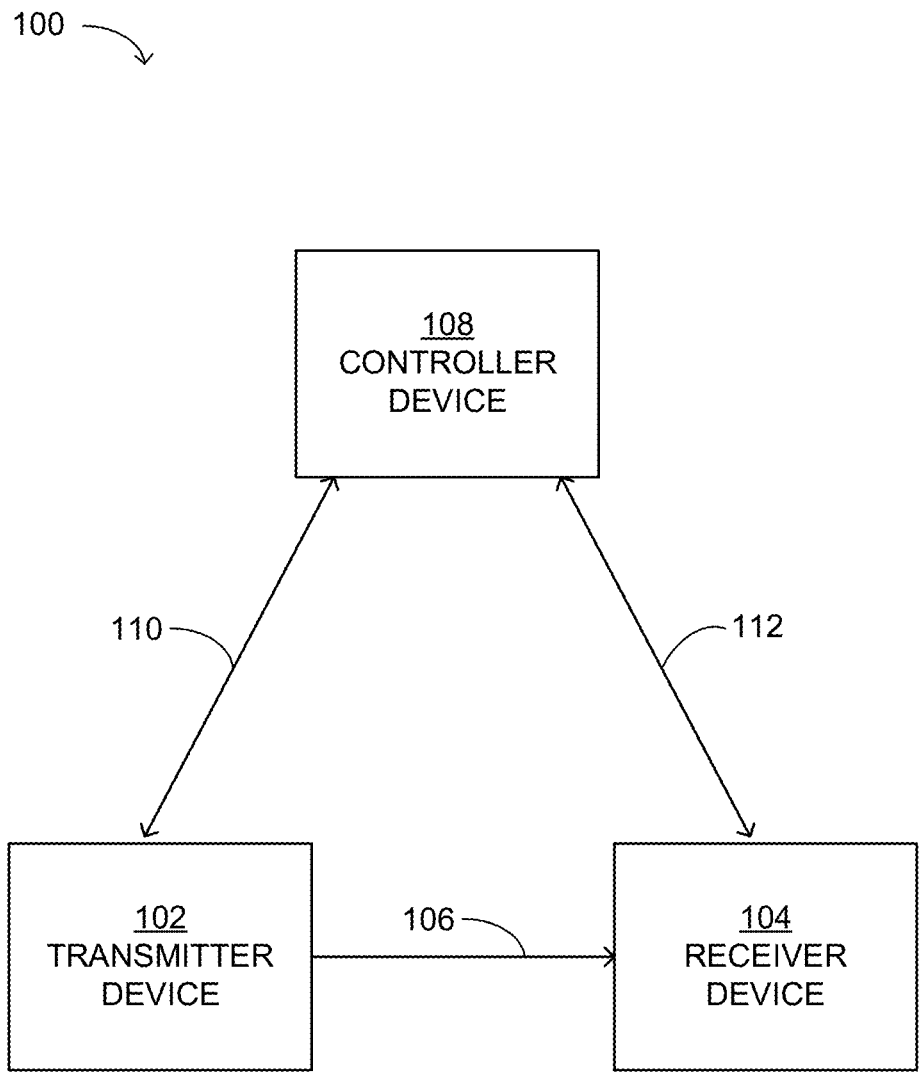
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem.

The communication network 100 may further comprise at least one controller device 108, where the controller device 108 is capable of transmitting signals to one or both of the transmitter device 102 and the receiver device 104, or receiving signals from one or both of the transmitter device 102 and the receiver device 104, or both. Communication of signals between the controller device 108 and the transmitter device 102 may take place over a communication channel 110, while communication of signals between the controller device 108 and the receiver device 104 may take place over a communication channel 112.

The communication network 100 may comprise additional elements not illustrated in FIG. 1. For example, the communication network 100 may comprise one or more additional transmitter devices, one or more additional receiver devices, one or more additional controller devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like.

According to some examples, the controller device 108 may be operable to transmit signals to one or more devices in the communication network 100 to cause changes in one or more parameters of the communication network 100. For example, the parameters may comprise one or more of data rate, launch power, transmission distance, channel spacing, add-drop filter configuration, and network routing.

Various elements and effects in the communication network 100 may result in the degradation of signals transmitted between different devices. Thus, a signal received at the receiver device 104 may comprise a degraded version of a signal transmitted by the transmitter device 102. For example, where the communication channel 106 is an optical communication channel, the signal transmitted by the transmitter device 102 may be degraded by optical amplifier noise, optical nonlinearity, polarization-dependent loss or gain (PDL or PDG), polarization mode dispersion (PMD), frequency-dependent loss, and other effects. The degree of signal degradation may be characterized by signal-to-noise ratio (SNR), or alternatively by noise-to-signal ratio (NSR). The signals transmitted in the communication network 100 may be representative of digital information in the form of bits or symbols. The probability that bit estimates recovered at a receiver differ from the original bits encoded at a transmitter may be characterized by the Bit Error Ratio or Bit Error Rate (BER). As the noise power increases relative to the signal power, the BER may also increase.

There may exist certain requirements with respect to the maximum BER that is deemed tolerable in a communication network. For example, a service level agreement (SLA) may specify that the BER at the receiver device 104 must not exceed $10^{-15}$. The use of Forward Error Correction (FEC) techniques may satisfy such a requirement by reducing the BER. For example, a FEC encoding operation may be applied to bits or symbols at the transmitter device 102, thereby resulting in FEC-encoded bits or symbols which include redundant information, such as parity or check bits. Where the FEC encoding operation is applied at the transmitter device 102, the signal transmitted over the communication channel 106 is representative of the FEC-encoded bits or symbols. According to some examples, the FEC encoding may be applied to multi-bit symbols. From the degraded version of the signal received at the receiver device 104, the receiver device 104 may recover estimates of the FEC-encoded bits or symbols, and may apply a FEC decoding operation to those estimates to detect and correct bit errors. The combination of a FEC encoding operation and the corresponding FEC decoding operation are herein referred to as a "FEC scheme." Stronger FEC schemes provide better protection (i.e., better error detection and correction) by adding more redundancy. However, this is at the expense of a lower information rate R. Circuitry to implement stronger FEC schemes may also take up more space, may be more costly, and may produce more heat than circuitry to implement weaker (i.e., higher-rate) FEC schemes.

A FEC scheme may be implemented using hard decision FEC decoding or soft decision FEC decoding. In hard decision FEC decoding, using BPSK as an illustrative example, a firm decoding decision is made by comparing a received signal to a threshold; anything above the threshold is decoded as "1" and anything below the threshold is decoded as "0". In soft decision FEC decoding, additional probability bits are used to provide a more granular indication of the received signal; in addition to determining whether the incoming signal is "1" or "0" based on the threshold, the soft decision FEC decoding also provides an indication of confidence in the decision, using a log likelihood ratio (LLR), for example. While soft decision FEC decoding is more noise tolerant than hard decision FEC decoding, it is also more complicated to implement.

FEC-encoded bits or symbols transmitted from a transmitter to a receiver may be arranged into blocks, referred to herein as FEC blocks. Each FEC block may consist of a plurality of FEC-encoded bits or symbols arranged into rows and columns. According to one example, a single FEC block may comprise 128×128 FEC-encoded bits. Each FEC block received at the receiver may undergo iterative FEC decoding until all of the bit errors in the FEC block have been corrected or until a maximum number of iterations has been reached, whichever occurs first. Iterative FEC decoding may comprise the application of a FEC decoding algorithm to individual rows and individual columns of a FEC block. A single iteration of a FEC decoding operation may herein be referred to as a FEC iteration. According to one example, a single FEC iteration may be defined as the application of the FEC decoding algorithm to all rows of the FEC block, and then to all columns of the FEC block. According to other examples, a single FEC iteration may be defined as the application of the FEC decoding algorithm to only the rows of the FEC block, or only the columns of the FEC block. Other definitions of a single FEC iteration are contemplated.

Numerous FEC decoding operations are possible. FEC decoding operations may involve, for example, low-density parity-check (LDPC) codes, such as those described by Roberts et al. in U.S. Pat. No. 8,230,294; turbo codes, such as those described by Berrou et al. in French Pat. No. 2747255; turbo product codes, such as those described by Pyndiah et al. in French Pat. No. 2753026; polar codes, such as those described by Arikan in "A performance comparison of polar codes and Reed-Muller codes," *IEEE Commun. Lett.*, Volume 12, Issue 6, 2008; product codes, such as those described by Lin et al. in "Error control coding ($2^{nd}$ edition)," Pearson, 2004; chain decoding, such as that described by Oveis Gharan et al. in U.S. Pat. Application Publication No. 20190190651; block parity codes, such as those described by Roberts et al. in U.S. Pat. No. 10,200,149; compression codes, such as those described by Oveis Gharan et al. in U.S. Pat. Application Publication No. 20190081730; or other codes. According to some examples, pipelined decoding may be used, whereby data is forwarded to successive stages of the processing hardware for successive operations to be performed. According to some examples, FEC decoding may occur in sequences of waves, including unidirectional waves, back-and-forth waves, or other flow patterns. According to some examples, where infinite or tail-biting FEC encoding is used, the FEC decoding may be applied to streams of FEC-encoded bits, rather than blocks. According to some examples, large FEC blocks could be used where a subset of the block is processed while the rest is held in memory. According to some examples, parallel decoding of FEC blocks or streams could be used. It may be advantageous to do sub-calculations in parallel. According some examples, overlapping FEC blocks could be used, such as with staircase codes. According to some examples, overlapping FEC structures could be used, such as with the O-FEC standard described in document CD11-E0X entitled "OFEC description", SG15 Q11, Acacia Communications, et al., 2018. According to some examples, FEC decoding could comprise successive passes over a window that moves along the stream of bits. According to some examples, different FEC decoding operations may be performed upon different subsets of received bits. According to some examples, FEC decoding may be concatenated, such that one form of FEC decoding follows another. For example, hard FEC decoding may follow soft FEC decoding. According to some examples, analog or quantum methods of FEC decoding may be used.

Where FEC decoding is applied to blocks of FEC-encoded bits or symbols, all of the bit errors or symbol errors in a given FEC block may be corrected as a result of the receiver applying a certain number of FEC iterations, $N_{ITER}$, to the FEC block. However, the receiver may limit the number of FEC iterations that are permitted to a maximum number, $N_{ITER\_MAX}$. The maximum number of FEC iterations, $N_{ITER\_MAX}$, may be defined based on the amount of time required to complete a single FEC iteration, the data rate, and the amount of buffering at the receiver. If the number of FEC iterations applied to a given FEC block reaches the maximum number, $N_{ITER\_MAX}$, without all of the bit errors having been corrected, the FEC decoding is considered to have failed, and the result is a frame error.

An increase in noise power relative to signal power may result in an increase in BER. An increased BER places more strain on FEC decoding. For example, with an increase in NSR, there may be increase in the number of FEC iterations, $N_{ITER}$, needed to correct all of the bit errors in a FEC block. As $N_{ITER}$ approaches $N_{ITER\_MAX}$, the probability of a frame error increases. It is of interest to keep the frame error rate (FER) extremely low. A given application may have a maximum FER that is deemed tolerable. For example, a SLA may specify that the maximum tolerable FER is $10^{-12}$. The proximity of the observed FER to the maximum tolerable FER may be referred to as the margin. Accurate knowledge of the margin is valuable because it provides an indication of how close the system is to failure.

To increase system performance (for example, by increasing data rate or propagation distance or by decreasing power usage), it may be of interest for the system to exhibit a FER that is as close as possible to the maximum tolerable FER without exceeding it. However, because frame errors are generally very rare, it is difficult to directly measure the FER exhibited by the system.

A receiver device may be configured to store and/or output information about the results of the FEC decoding applied at the receiver device. For example, as the receiver device is performing FEC decoding, the receiver device may periodically store indications of the number of bit corrections performed within a specific period of time. The number of bit corrections per time period may provide an indirect measure of the average BER of the FEC-encoded bits received in that time period. In another example, the average BER of the FEC-encoded bits may be estimated by a comparison of the FEC-encoded bits to the bit estimates recovered from the FEC decoding. In one example, the receiver device is operable to store and/or output the average BER of the FEC-encoded bits received every second.

In addition to average BER, there are other parameters that may be used to estimate performance in an optical communication network. For example, extrinsic information transfer (EXIT) charts may be used to estimate performance of FEC decoding, particularly for LDPC FEC schemes. Generalized mutual information may also be used to estimate FEC performance, for example, as described by Schmalen et al. in "Performance predication of nonbinary forward error correction in optical transmission experiments," *Journal of Lightwave Technology*, Volume 35, Issue 4, 2017. Methods for monitoring phase nonlinearities are described, for example, by Roberts et al. in U.S. Pat. No. 8,594,499. U.S. Pat. No. 7,457,538 to Strawczynski et al. describes methods for monitoring digital performance of an optical communication system. U.S. Pat. No. 5,896,391 to Solheim et al. describes using FEC to map out error contours in a received eye. U.S. Pat. No. 7,561,797 to Harley et al. describes adding calibrated amounts of digital noise so that measurable rates of bit errors occur and then are detected and corrected by the FEC. The amount of noise that needs to be added to achieve some BER allows estimation of the margin. U.S. Pat. No. 9,438,369 to Swinkels et al. describes an application that makes use of margin or SNR measurements to optimize capacity. U.S. Pat. Application Publication No. 20090256622 to Roberts describes measuring the temperature or heat due to FEC.

Where the noise on a signal is completely uncorrelated, such as additive white Gaussian noise (AWGN), FEC techniques generally work well for correction of bit errors. In such cases, the BER of the FEC-encoded bits may be used to provide an accurate prediction of the FER. With the assumption of AWGN and knowledge of the FEC parameters (FEC design and parameterization, block size, signal and noise quantization and scaling, and the like), the precise relationship between the BER and the FER may be determined from computer simulations. Thus, under an assumption of exclusively uncorrelated noise, the BER measurement provided by a receiver device may be used to predict the FER, and thus the margin.

In practice, the noise on a signal may comprise some amount of correlation which may place more strain on the FEC decoding, thereby increasing the number of FEC iterations, $N_{ITER}$, needed to correct all of the bit errors in a given FEC block, and increasing the probability of a frame error. The presence of correlated noise may result in an actual FER that is higher than the FER that would be predicted from the measured BER of the FEC-encoded bits. To account for this, network parameters may be selected to provide extra margin between the predicted FER and the maximum tolerable FER, thereby ensuring the actual FER does not exceed the maximum tolerable FER. This padding of the margin may limit system performance.

Computer simulations may be used to predict FEC performance for cases of non-AWGN noise sources, as well as correlated noise sources. In most cases, it may be difficult to determine the detailed statistical properties of the noise on the FEC-encoded bits entering the FEC decoding in an operating modem. Uncertainty in the properties of the noise as well as variation between applications may make it difficult to simulate FEC performance for a range of applications.

As previously discussed, a receiver device may use FEC decoding data to provide periodic measurements of the average BER of FEC-encoded bits that undergo FEC decoding within a specific period of time. A very large number of FEC-encoded bits may be processed during this specific period of time. For example, during a single second, the receiver device may process 10 million FEC blocks comprising 100 billion FEC-encoded bits. Thus, the periodic measurements of average BER provided by the receiver device may provide little to no information about relatively rare events that affect individual FEC blocks. For example, a single FEC block out of the 10 million FEC blocks might suffer from a large number of bit errors, such that the FEC decoding almost results in a frame error for that block. Yet, the average BER across all bits in the 10 million FEC blocks would be virtually unaffected by the bit errors in a single FEC block, and would provide no indication of how close the system was to failure. Furthermore, the average BER reported by the receiver device does not provide information about how the noise is distributed. For example, it is not possible distinguish from the average BER how much correlation there is in the noise.

In addition to providing information about average BER, a receiver device may also be configured to store and/or output other statistical properties of the FEC decoding. In one example, the receiver device may store and/or output FEC iteration data determined from measurements of the number of FEC iterations applied to each FEC block during FEC decoding. This measured FEC iteration data may comprise, for example, one or more histograms, where each histogram is accumulated over a specific period of time and where each histogram provides, for each number $N_{ITER}$, up to $N_{ITER\_MAX}$, a record of how many times that number $N_{ITER}$ of FEC iterations were required to correct all errors in a FEC block. In other words, the histogram represents a frequency distribution of FEC iterations over all FEC blocks the undergo FEC decoding within the specific period of time. Each histogram may have a corresponding probability mass function (PMF), which may be determined by normalizing the histogram by the total number of FEC blocks over which the histogram has been accumulated. According to some examples, the measured FEC iteration data that is stored and/or output by the receiver device may comprise one or more PMFs, where each PMF represents a measured FEC iteration distribution over a plurality of FEC blocks received at the receiver device within a specific period of time, such as one second.

In contrast to the average BER, which may provide little or no information about rare events that affect relatively few FEC blocks within a very large number of FEC blocks processed over a specific period of time, the measured FEC iteration data may provide quantitative information about every single FEC block processed within that period of time. Returning to the previous example in which a single FEC block, out of the 10 million FEC blocks, has a large number of bit errors, the high number of FEC iterations, $N_{ITER}$, applied to this particular FEC block would be apparent from the FEC iteration histogram (and from the corresponding FEC iteration PMF).

Valuable information about the operating conditions of a receiver device that is currently deployed in a communication network may be gained using the FEC iteration distribution measured at the receiver. For example, the amount of correlated noise experienced at the receiver device may be determined by comparing the measured FEC iteration distribution to a reference FEC iteration distribution. According to one example, the reference FEC iteration distribution may be generated through computer simulations using noise with known properties. For example, a plurality of simulated FEC blocks may be generated based on a chosen FEC scheme, with the bit errors in each simulated FEC block being arranged according to a predefined noise distribution, such as AWGN. FEC decoding may be applied to the plurality of simulated FEC blocks to generate a reference FEC iteration distribution. If the average BER across the plurality simulated FEC blocks is chosen to match an average BER measured at the receiver device deployed in the communication network, then the reference FEC iteration distribution may be directly compared to the measured FEC iteration distribution. Such a comparison may be used to provide an assessment of the operating conditions of the receiver device. Examples of how such assessments may be made will be described further with respect to FIGS. 4 and 5. According to other examples, a reference FEC iteration distribution may be generated through analytic calculations such as union bound estimates or through calibration using real hardware in known noise conditions. A transceiver may be arranged in known noise loading conditions and the FEC iteration distributions measured under these known conditions could be used as reference distributions.

The examples presented herein primarily focus on the use of FEC iteration data in the assessment of receiver operating conditions. However, a receiver device may alternatively or additionally make use of other indirect properties of the FEC decoding for assessment of operating conditions. For the purposes of this document, "indirect FEC decoding properties" are distinguished from "direct FEC decoding properties." Direct FEC decoding properties may comprise direct or raw measurements of numbers of errors corrected, evolution of mutual information, and the numbers or occurrences of frames with residual errors. For example, measurements of direct FEC decoding properties may include measurements of corrected bits and/or uncorrected bits; measurements of corrected frames and/or uncorrected frames; measurements of corrected blocks and/or uncorrected blocks; measurements of corrected events and/or uncorrected events; and measurements of events containing uncorrected bits. In contrast, measurements of indirect FEC decoding properties may include measurements of FEC iteration data; heat or temperature measurements including heat dissipation and silicon temperature; current or voltage measurements including current drawn, supply voltage variance, supply voltage droop, and supply voltage pattern; data delay measurements such as data delay of a variable latency decoder; measurements of a number or proportion of idle clock cycles of an iterative decoder; measurements of a number or proportion of active clock cycles of an iterative decoder; measurements of a number of parallel engines active; measurements of a number of active pipeline stages or activity level of each stage of a pipelined decoder; measurements of fill level or status of input or output buffers of the FEC decoding; and the like.

While it may be of interest to lower the supply voltage or increase the clock frequency, large changes in such parameters may impair the accuracy of the digital function, and may result in frame errors. Measurements of the relationship between FEC statistics and parameters such as supply voltage and clock frequency may be useful for optimizing the selection of these parameters in consideration of observed impairments.

In general, the technology described herein is configured to provide an assessment (or evaluation, or characterization, or classification, or inference) of the operating conditions (or behaviour, or environment, or performance, or status) of a receiver device that is deployed in a communication network based on a measurement of at least one indirect FEC decoding property that is associated with applying FEC decoding to FEC-encoded bits or symbols at the receiver device. According to some examples, the assessment may additionally be based on reference FEC data, which may be associated with application of the FEC decoding under predefined noise conditions.

A "deployed" receiver device may be understood to be a receiver device (or a transceiver device) that is installed in a communication network for the primary purpose of receiving (or transporting) client data. This is in contrast to a non-deployed receiver device, which might be evaluated using synthesized data under known conditions in a laboratory.

Figure 2:
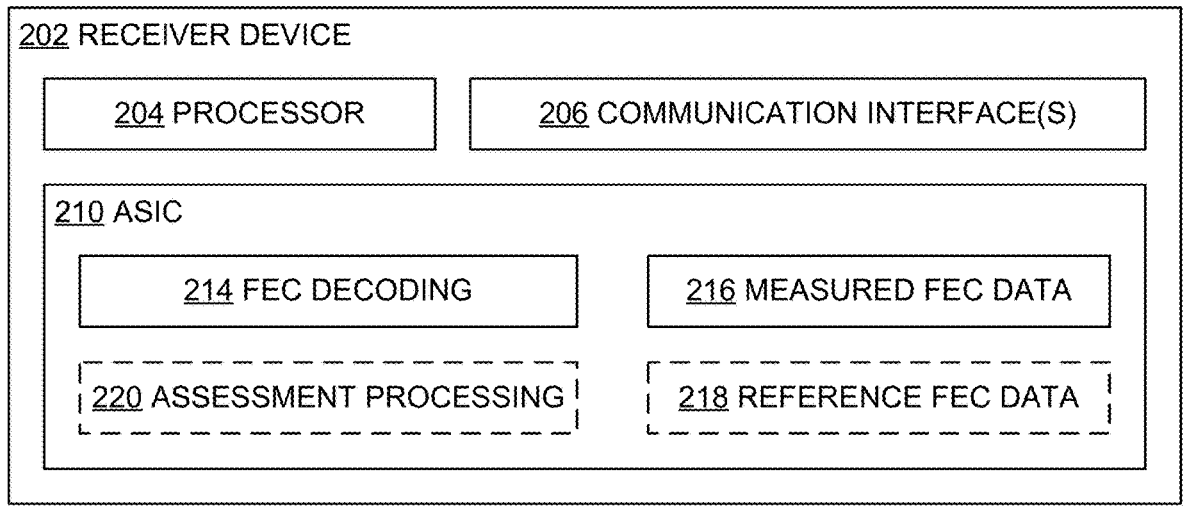
FIG. 2 illustrates an example receiver device in accordance with some examples of the technology disclosed herein.

FIG. 2 illustrates an example receiver device 202 in accordance with some examples of the technology disclosed herein.

The receiver device 202 is an example of the receiver device 104 illustrated in FIG. 1. According to one example, the receiver device 202 comprises a coherent modem.

The receiver device 202 comprises a processor 204, one or more communication interfaces 206, and an application specific integrated circuit (ASIC) 210. According to some examples, the processor 204 may be operable to monitor and control the ASIC 210. According to some examples (not shown), the receiver device 202 may comprise a memory storing code which is executable by the processor 204. According to some examples, the processor 204 and the memory are comprised in a digital signal processor (DSP). According to some examples, the receiver device 202 may comprise one or more user interface elements (not shown), such as a display screen, a keyboard, a mouse, and the like.

The one or more communication interfaces 206 may comprise elements for receiving signals from other devices, such as the transmitter device 102 or the controller device 108, and for converting the received signals into digital signals. The communication interfaces 206 may also comprise elements for converting digital signals generated at the receiver device 202 into transmittable signals, and for transmitting the transmittable signals to other devices. The signals received at the receiver device 202 and transmitted by the receiver device 202 may comprise any combination of electrical signals, optical signals, and wireless signals. According to some examples, the communication interfaces 206 may comprise at least one optical communication interface operable to convert optical signals received at the receiver device 202 into digital signals which may be processed by the ASIC 210. Such an interface may be referred to as an optical signal receiving interface. According to some examples, an optical signal receiving interface may comprise a polarizing beam splitter to split received optical signals into orthogonally-polarized components, an optical hybrid to process the orthogonally-polarized components with respect to an optical signal produced by a laser, photodetectors to convert the outputs of the optical hybrid to analog signals, and analog-to-digital converters (ADCs) to sample the analog signals and generate corresponding digital signals. According to some examples, the communication interfaces 206 may alternatively or additionally comprise at least one optical communication interface operable to convert digital signals generated at the receiver device 202 into optical signals for transmission to other devices. Such an interface may be referred to as an optical signal transmitting interface. According to some examples, an optical signal transmitting interface may comprise a polarizing beam splitter to split a continuous wave optical carrier generated by a laser into orthogonally-polarized components, digital-to-analog converters (DACs) to convert digital signals generated at the receiver device 202 into analog signals, electrical-to-optical modulators which use the analog signals to modulate the orthogonally-polarized components of the CW optical carrier, and a beam combiner to combine the modulated polarized optical signals into optical signals to be transmitted to other devices.

At least one communication interface 206 is operable to convert signals received from a transmitter device, such as the transmitter device 102, into digital signals that are representative of FEC-encoded bits or symbols. The receiver device 202 is operable to process the FEC-encoded bits or symbols by applying FEC decoding 214, where the FEC decoding 214 corresponds to FEC encoding previously used to generate the FEC-encoded bits or symbols. According to some examples, the FEC-encoded bits or symbols may be arranged in a plurality of FEC blocks, and the FEC decoding 214 may be implemented by iteratively applying a FEC decoding operation to the plurality of FEC blocks. In the example of FIG. 2, the FEC decoding 214 is implemented by the ASIC 210. However, in other examples, the FEC decoding 214 may be implemented by a field-programmable gate array (FPGA), by a portion of a circuit, or as a result of the processor 204 executing code stored in a memory of the receiver device 202.

As a result of implementing the FEC decoding 214, measured FEC data 216 may be stored at the receiver device 202. The measured FEC data 216 may be stored in the ASIC 210, as shown in FIG. 2, or in a separate memory (not shown). In general, the measured FEC data 216 may comprise at least one measurement of an indirect FEC decoding property associated with or resulting from applying the FEC decoding 214 to FEC-encoded bits or symbols processed at the receiver device 202. According to some examples, the indirect FEC decoding property may comprise a distribution of values associated with applying the FEC decoding 214 over a period of time. The period of time may comprise a predefined duration. According to some examples, the period of time may be on the order of one second. According to one example, the measured FEC data 216 may comprise a measured frequency distribution of iterations of a FEC decoding operation applied to each of a plurality of FEC blocks processed at the receiver device 202 within a period of time. A single iteration of the FEC decoding operation, also referred to as a FEC iteration, may be defined based the FEC decoding 214. For example, a single FEC iteration may be defined as the application of the FEC decoding 214 to all rows of a FEC block, and then to all columns of the FEC block. The measured FEC data 216 may comprise one or more histograms, one or more PMFs, or both, where each histogram and PMF represents a frequency distribution of FEC iterations over a plurality of FEC blocks. According to other examples, the measured FEC data 216 may comprise other statistical results associated with applying the FEC decoding 214.

The receiver device 202 may be configured to output the measured FEC data 216, for example, by causing the communication interface(s) 206 to transmit signals representative of the measured FEC data 216 to one or more other devices. According to one example, the receiver device 202 may provide the measured FEC data 216 to a controller device, such as the controller device 108.

According to some examples, the receiver device 202 may store reference FEC data 218. The reference FEC data 218 may be stored in the ASIC 210, as shown in FIG. 2, or in a separate memory (not shown). According to some examples, the reference FEC data 218 may be received via the communication interface(s) 206 from one or more other devices. Alternatively, the reference FEC data 218 may be generated at the receiver device 202, for example, as a result of processing performed by the ASIC 210, or as a result of the processor 204 executing code stored in a memory of the receiver device 202. According to some examples, the reference FEC data 218 may comprise at least one reference FEC decoding property associated with application of the FEC decoding 214 under predefined noise conditions. For example, as described previously, the reference FEC data 218 may comprise reference FEC iteration distributions determined using computer simulations, analytic calculations, or calibration under known conditions. The reference FEC data 218 may comprise one or more histograms, one or more PMFs, or both.

According to some examples, the receiver device 202 may be configured to apply additional processing to the measured FEC data 216 (and optionally to the reference FEC data 218), for example, by implementing assessment processing 220. The assessment processing 220 may be implemented using the ASIC 210, as shown in FIG. 2. According to other examples (not shown), the assessment processing 220 may be implemented by the processor 204 executing assessment code stored in a memory to the receiver device 202. Execution of the assessment processing 220 may generate assessment results, which may be transmitted via the communication interface(s) 206 to one or more other devices, such as the controller device 108. Alternatively or additionally, the assessment results generated by the assessment processing 220 may be stored and/or output to a graphical user interface (not shown) at the receiver device 202. Examples of the additional processing achieved with the assessment processing 220 and the assessment results generated by the assessment processing 220 are described further with respect to FIGS. 5-13.

Figure 3:
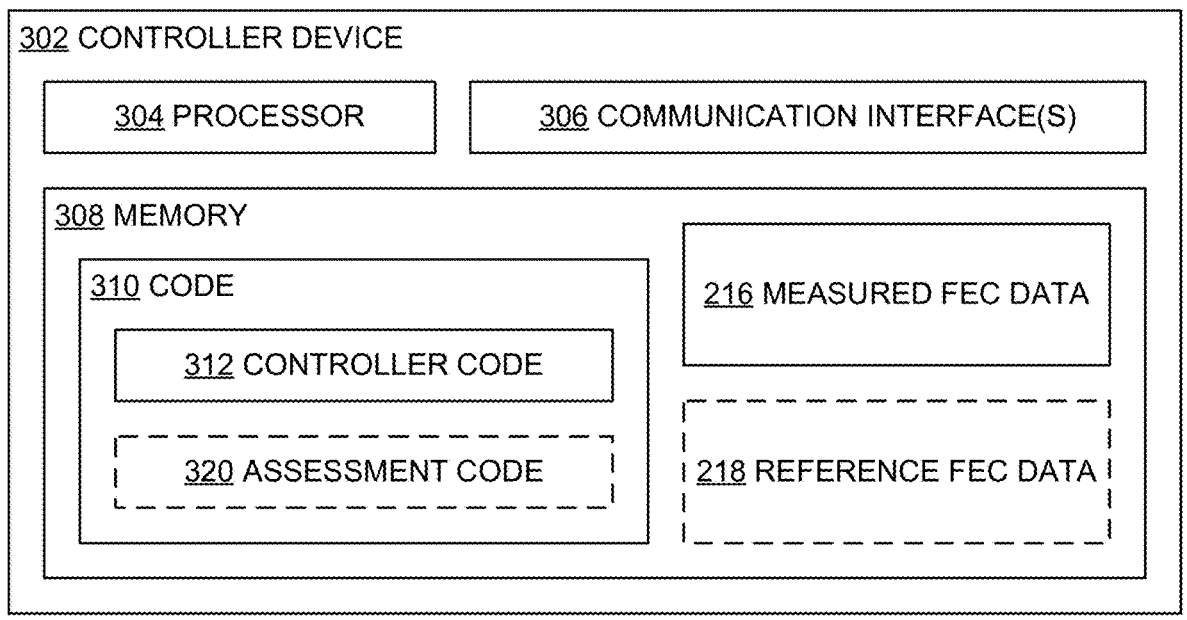
FIG. 3 illustrates an example controller device in accordance with some examples of the technology disclosed herein.

FIG. 3 illustrates an example controller device 302 in accordance with some examples of the technology disclosed herein.

The controller device 302 is an example of the controller device 108 illustrated in FIG. 1.

The controller device 302 comprises a processor 304, one or more communication interfaces 306, and a memory 308. The memory 308 stores code 310 which is executable by the processor 304. According to some examples, the processor 304 and the memory 308 are comprised in a DSP. According to some examples, the controller device 302 may comprise one or more user interface elements (not shown), such as a display screen, a keyboard, a mouse, and the like.

The one or more communication interfaces 306 may comprise elements for receiving signals from other devices, such as the transmitter device 102 or the receiver device 104, and for converting the received signals into digital signals.

The communication interfaces 306 may also comprise elements for converting digital signals generated at the controller device 302 into transmittable signals, and for transmitting the transmittable signals to other devices. The signals received at the controller device 302 and transmitted by the controller device 302 may comprise any combination of electrical signals, optical signals, and wireless signals.

The controller device 302 may be configured to initiate a change in one or more parameters of a communication network by transmitting signals to one or more other devices in the network. For example, the code 310 may comprise controller code 312 which, when executed by the processor 304, causes the processor 304 to generate signals for transmission over the communication interface(s) 306, where the signals are representative of data, instructions, or commands which, when received by one or more other devices in the communication network, may cause those devices to adjust one or more parameters of the network. The network parameters may include, for example, any combination of channel power, choice of modulation format, carrier recovery parameters or other modem parameters, routing of a channel or its neighbours, and the like.

According to some examples, at least one communication interface 306 is operable to convert signals received from a receiver device, such as the receiver device 202, into digital signals that are representative of the measured FEC data 216. Execution of the code 310 by the processor 304 may result in the processor 304 storing the measured FEC data 216 in the memory 308 of the controller device 302. According to one example, the controller device 302 may be configured to display the measured FEC data 216 using a display screen (not shown). In one example, the controller device 302 may receive signals representative of the measured FEC data 216 in response to transmitting a request or a command to the receiver device 202 over one of the communication interface(s) 306. The transmission of such a request may be initiated by an administrator or an orchestrator.

According to some examples, the memory 308 may store the reference FEC data 218. According to some examples, the reference FEC data 218 may be received via the communication interface(s) 306 from one or more other devices, such as the receiver device 202. Alternatively, the reference FEC data 218 may be generated as a result of the processor 304 executing the code 310.

According to some examples, the controller device 302 may be configured to apply additional processing to the measured FEC data 216 (and optionally to the reference FEC data 218), for example, by executing assessment code 320. Execution of the assessment code 320 may generate assessment results, which may be transmitted via the communication interface(s) 306 to one or more other devices. Alternatively or additionally, the assessment results generated by the assessment code 320 may be stored and/or output to a graphical user interface (not shown) at the controller device 302. Examples of the additional processing achieved with the assessment code 320 and the assessment results generated by the assessment code 320 are described further with respect to FIGS. 5-13.

As previously described, the controller device 302 may generate signals to initiate changes in network parameters. Such signals may be generated in response to the execution of the assessment code 320. Alternatively, the signals may depend on assessment results received over the communication interface(s) 306 from one or more other devices, such as the receiver device 202.

In other examples (not shown), the controller device 302 may be configured to implement controller processing (e.g., initiating changes in network parameters) and/or to implement assessment processing using an ASIC (not shown) that is monitored and controlled by a processor, such as the processor 304.

Figure 4:
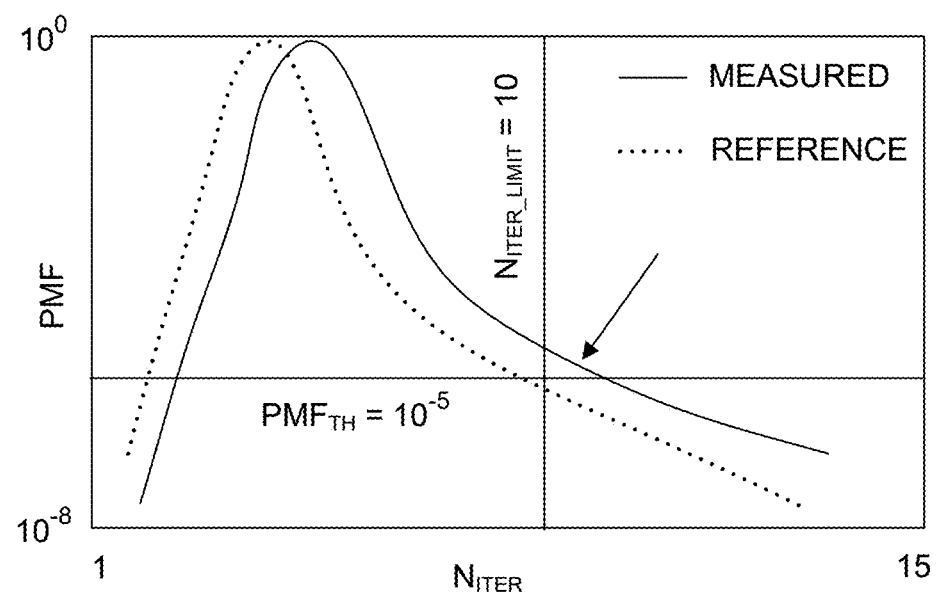
FIG. 4 illustrates an example measured forward error correction (FEC) iteration probability mass function (PMF) and an example reference FEC iteration PMF.

FIG. 4 illustrates an example measured FEC iteration PMF and an example reference FEC iteration PMF. The measured FEC iteration PMF has been calculated from FEC iteration data measured at a receiver device that is deployed in a communication network, while the reference FEC iteration PMF has been calculated, for example, using computer simulations under predefined noise conditions. The ranges of PMF values and $N_{ITER}$ values are for illustrative purposes only and should not be considered necessarily limiting.

According to some examples, the measured FEC iteration PMF may be used on its own to provide an assessment of operating conditions of the receiver device in the communication network. According to one example, an assessment may be based on the probabilities associated with only those values of $N_{ITER}$ that are greater than some threshold value, $N_{ITER\_LIMIT}$. For example, if any one of those probability values is greater than a probability threshold, $PMF_{TH}$, then an assessment of the operating conditions of the receiver device may indicate that the receiver device is experiencing a high or unacceptable level of noise. This scenario is illustrated in FIG. 4, where $N_{ITER\_LIMIT}=10$ and $PMF_{TH}=10^{-5}$. As denoted by the arrow, the measured FEC iteration PMF has a probability greater than $PMF_{TH}$ when $N_{ITER}>N_{ITER\_LIMIT}$, which would result in an assessment indicating that the receiver is experiencing an unacceptable level of noise. Other criteria may be defined, such as requiring the sum of probabilities for $N_{ITER}>N_{ITER\_LIMIT}$ to be less than some threshold in order to make an assessment that the receiver device is operating, for example, in a manner that is consistent with expectations. The probability threshold and the choice of $N_{ITER\_LIMIT}$ may be chosen based on the average BER and some other measure of the noise experienced by the receiver device under some assumption about the properties of that noise, such as the noise being uncorrelated AWGN.

According to some examples, a comparison between the measured FEC iteration PMF and the reference FEC iteration PMF may be used to facilitate an assessment of the operating conditions of the receiver device in the communication network. For example, a simple visual comparison of the measured FEC iteration PMF to the reference FEC iteration PMF may be used to determine whether the receiver device is or is not operating in pure uncorrelated noise. For example, if the two curves are very similar to one another, an assessment may be made that the receiver device is operating in noise that is substantially uncorrelated. In such cases where the measured FEC iteration PMF is similar to, or within a certain proximity of, the reference FEC iteration PMF, the assessment of the operating conditions may indicate that the BER measurement provided by the receiver device is expected to provide an accurate prediction of the FER and the margin. In cases where the measured FEC iteration PMF differs substantially from the reference FEC iteration PMF, the assessment of the operating conditions may indicate that the BER measurement provided by the receiver device is not expected to provide an accurate prediction of the FER and the margin.

According to some examples, assessments of receiver operating conditions that are based on comparisons between a measurement of an indirect FEC decoding property and reference FEC data may involve the use of one or more masks.

Figure 5:
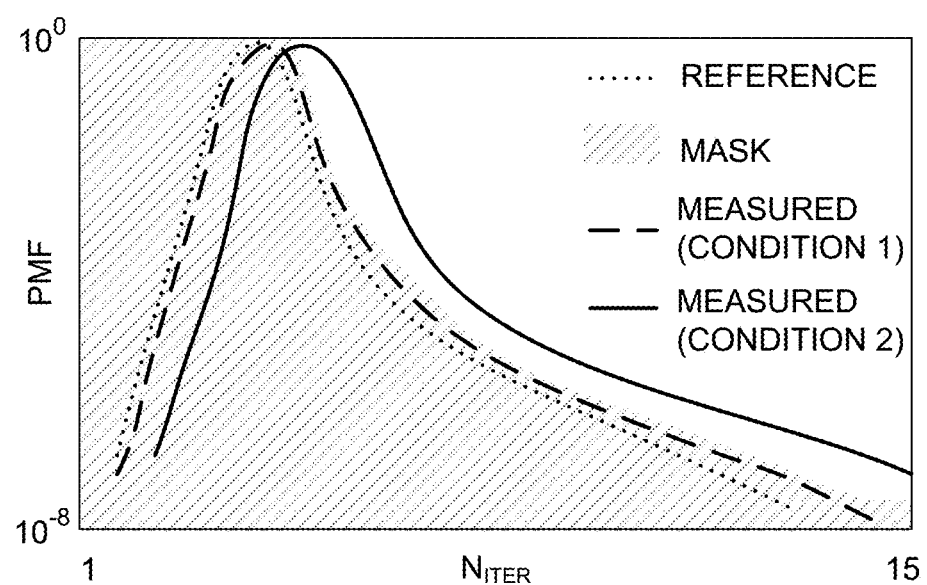
FIG. 5 illustrates two example measured FEC iteration PMFs and an example mask based on the reference FEC iteration PMF illustrated in FIG. 4.

FIG. 5 illustrates two example measured FEC iteration PMFs and an example mask based on the reference FEC iteration PMF illustrated in FIG. 4. The ranges of PMF values and $N_{ITER}$ values are for illustrative purposes only and should not be considered necessarily limiting.

The dashed curve represents a measured FEC iteration PMF obtained during a first operating condition at the receiver device, while solid curve represents a measured FEC iteration PMF obtained during a second operating condition at the receiver device. As is apparent from a visual comparison of the dashed curve to the solid curve, the noise experienced at the receiver device during the second operating condition is placing more strain on the FEC decoding than the noise experienced during the first operating condition. Higher numbers of FEC iterations are needed to correct the bit errors, as is reflected by the flaring of the solid curve relative to the dashed curve at higher $N_{ITER}$ values. This additional strain on the FEC decoding may be caused by the distribution of bit errors, the number of errors, correlation in the noise, or combinations thereof.

The hatched area represents an example mask which may be used as part of the assessment of the measured FEC iteration PMF curves. The mask may specify certain $N_{ITER}$ values and respective probabilities that are indicative of one category of operating conditions, whereas any $N_{ITER}$ values and respective probabilities that are not within, or not substantially within, the region specified by the mask may be indicative of another different category of operating conditions. According to some examples, the mask may be generated based on reference FEC iteration data. For example, as illustrated in FIG. 5, the mask may encompass the reference FEC iteration PMF from FIG. 4, but with an additional predefined margin for each PMF value. According to one example, where it is determined that a measured FEC iteration PMF is entirely within or substantially within the mask, an assessment may be provided that the operating conditions of the receiver device are "normal" or "as expected" (e.g., within a tolerable level of noise or distribution of noise). For example, based on a comparison of the mask to the measured FEC iteration PMF represented by the dashed curve, an assessment may be provided that the receiver in first operating condition is operating in a noise environment that is well understood. Conversely, where it is determined that some portion of a measured FEC iteration PMF outside of the mask, an assessment may be provided that the receiver device is operating in unacceptable or problematic conditions (e.g., beyond a tolerable level of noise or distribution of noise). For example, based on a comparison of the mask to the measured FEC iteration PMF represented by the solid curve, an assessment may be provided that the receiver in the second operating condition is operating in a non-negligible amount of correlated noise. As described previously, such as assessment may indicate that the BER measurement provided by the receiver device in the second operating condition is not expected to provide an accurate prediction of the FER and the margin.

Although not shown in FIG. 5, it is contemplated that additional masks may be defined for use in the assessment of operating conditions. For example, in addition to (or alternatively to) the mask illustrated in FIG. 5, a further mask could be defined which specifies certain combinations of $N_{ITER}$ values and their respective probabilities that will trigger a notification or warning when they are observed, or indicate the presence of certain operating conditions.

In addition to thresholds and masks, other means may be used to assess receiver operating conditions based on measured FEC iteration data. For example, transient events may be detected by observing bumps in the FEC iteration distribution at higher $N_{ITER}$ values. In another example, statistical properties of the FEC iteration distribution may be calculated, such as the mean, standard deviation, or higher moments. In another example, it may be possible to fit one or more functions to the FEC iteration distribution and interpret the fit parameters. In another example, the FEC iteration distribution may be used as input to a machine learning algorithm, such as a neural network, which is trained as a classifier or a regressor to estimate properties of the receiver or its environment based on the shape of the distribution.

According to some examples, the assessment of receiver operating conditions may comprise classification into a subset of one or more predefined categories or groups or statuses based on characteristics of the measured FEC data. For example, based on the FEC iteration distribution measured at a particular receiver, the receiver could be classified as belonging to a "normal operation" group or an "abnormal operation" group. In another example, the measured FEC iteration distribution could be used to classify the receiver as belonging to a "substantial nonlinear noise" group (which might manifest as flaring in the FEC iteration distribution) or a "transient events" group (which might manifest as isolated bumps at higher $N_{ITER}$ values in a FEC iteration distribution that might otherwise appear similar to a reference FEC iteration distribution under a known condition of AWGN). The group(s) and method(s) of classification may be defined by the assessment processing 220 or the assessment code 320. It will be apparent that a receiver device could be classified as belonging to different groups at different times, for example, as a result of changes in the measured FEC iteration distribution or changes in the manner of classification.

According to some examples, the shape of the measured FEC iteration distribution may be used to predict continuous variables, such as the expected FER.

Figure 6:
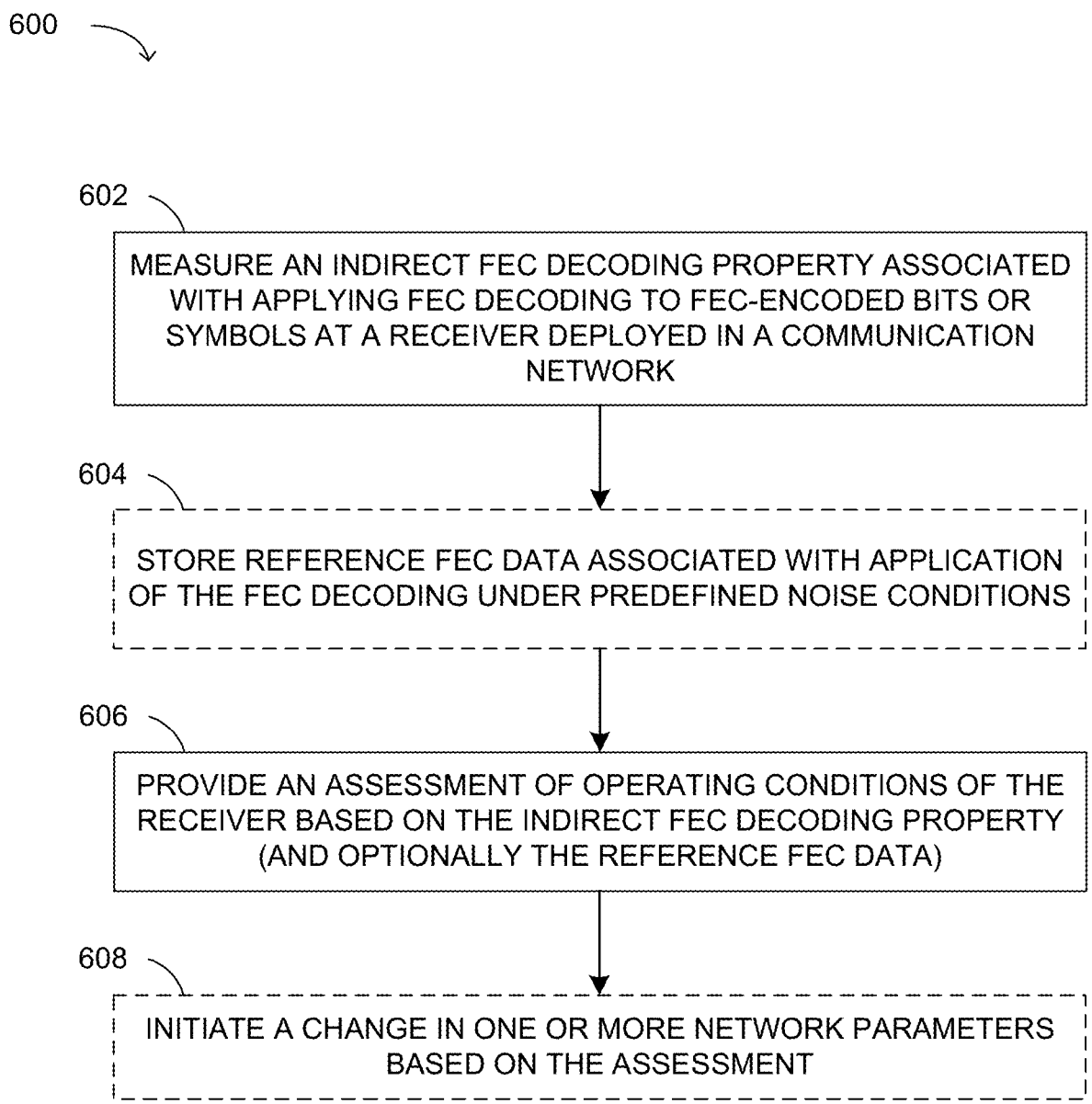
FIG. 6 illustrates an example method for assessing operating conditions of a receiver device deployed in a communication network using a measured FEC decoding property in accordance with some examples of the technology disclosed herein.

FIG. 6 illustrates an example method 600 for assessing operating conditions of a receiver device deployed in a communication network using a measured of an indirect FEC decoding property in accordance with some examples of the technology disclosed herein. According to some examples, the method 600 is performed in a communication network, such as the communication network 100. Some aspects of the method may be performed at a receiver device, such as the receiver device 104 or 202, while other aspects of the method may be performed at a controller device, such as the controller device 108 or 302. In general, the method 600 may be performed by a system comprising circuitry configured to implement the various steps of the method 600. The circuitry may be comprised in a single electronic device, or may be distributed within more than one electronic device. The circuitry may comprise various combinations of processors (including DSPs), computer-readable media storing computer-executable instructions or code, ASICs, and the like.

At 602, an indirect FEC decoding property is measured at an electronic device. The measurement of the indirect FEC decoding property results from (or is associated with) applying FEC decoding to FEC-encoded bits or symbols at a receiver device deployed in a communication network. For example, the indirect FEC decoding property may be measured as a result of the receiver device 202 applying the FEC decoding 214 to FEC-encoded bits or symbols. The indirect FEC decoding property may be stored as part of the measured FEC data 216 in the ASIC 210 of the receiver device 202, or in the memory 308 of the controller device 302, or both. According to some examples, the indirect FEC decoding property may comprise a statistical distribution. According to one example, the indirect FEC decoding property may comprise a distribution of a number of iterations of a FEC decoding operation applied to each of a plurality of FEC blocks processed within a period of time. In this case, the indirect FEC decoding property may comprise one or more histograms, one or more PMFs, or both. According to some examples, the indirect FEC decoding property may further comprise a measured noise power of the plurality of FEC blocks processed during the period of time. According to some examples, the measured noise power may be represented as a NSR value or a SNR value.

At 604, reference FEC data is optionally stored at an electronic device. For example, the reference FEC data 218 may be stored in the ASIC 210 of the receiver device 202, or in the memory 308 of the controller device 302, or both. In general, the reference FEC data stored at 604 may comprise, or may be based on, a reference FEC decoding property that is associated with the FEC decoding property measured at 602, but where the reference FEC decoding property is associated with application of the FEC decoding under predefined noise conditions. For example, where the measured FEC decoding property measured at 602 comprises the number of iterations of a FEC decoding operation applied to each of a plurality of FEC blocks processed within a period of time, the reference FEC data stored at 604 may comprise a reference frequency distribution of iterations of the FEC decoding operation applied to each of a plurality of reference FEC blocks exhibiting a predefined noise distribution and a predefined noise power. For example, the predefined noise distribution may be an uncorrelated noise distribution such as an AWGN distribution, and the predefined noise power may be substantially equal to a noise power comprised in FEC iteration data measured at 602. According to some examples, the reference FEC data may comprise one or more histograms, one or more PMFs, or both. According to some examples, the reference FEC data may comprise one or more masks. The masks may be defined based on a reference FEC decoding property, as described with respect to FIG. 5.

At 606, an assessment of receiver operating conditions is provided based on the indirect FEC decoding property measured at 602, and, optionally, based on the reference FEC data stored at 604. According to some examples, the assessment may be generated by comparing the indirect FEC decoding property and the reference FEC data. According to some examples, where the reference FEC data comprises one or more masks, the assessment may be generated by applying the one or more masks to the indirect FEC decoding property. According to one example, the assessment is performed as a result of the assessment processing 220 implemented by the ASIC 210. According to another example, the assessment is performed as a result of the processor 304 of the controller device 302 executing the assessment code 320. The assessment may be provided by storing assessment results, for example, in the ASIC 210 or in a separate memory of the receiver device 202, or in the memory 308 of the controller device 302. The assessment may additionally be provided by displaying the assessment results on a display screen of an electronic device. According to some examples, the assessment may be provided by transmitting the assessment results from one electronic device to another electronic device.

At 608, a change in one or more parameters of the communication network may optionally be initiated based on the assessment provided at 606. The network parameters may include, for example, any combination of channel power, choice of modulation format, carrier recovery parameters or other modem parameters, routing of a channel or its neighbours, and the like. According to some examples, changes may be initiated by controller device 302 transmitting signals to one or more other devices in the communication network. For example, as a result of an assessment provided at 606, the processor 304 of the controller device 302 may execute the controller code 312, which may result in the transmission of instructions to other network devices, where the instructions result in the adjustment of one or more network parameters. For example, where the current BER measured at the receiver device indicates that the predicted margin is large, and where an assessment provided at 606 indicates that the receiver device is operating in noise that is substantially uncorrelated, the controller device 302 may initiate an increase in data rate, based on a high level of confidence that the predicted margin is accurate. In another example, where the current BER measured at the receiver device indicates that the predicted margin is sufficient, and where an assessment provided at 606 indicates that the receiver device is operating in some degree of correlated noise, the controller device 302 may initiate a decrease in data rate, since the system may be closer to failure than expected from the BER. The change(s) in network parameters optionally initiated at 608 may be automatic in response to the assessment provided at 606, or may be based on actions performed by a user. For example, in response to viewing an assessment of receiver operating conditions on a display screen of the controller device 302, an administrator may initiate an adjustment of one or more network parameters using a keyboard of the controller device 302.

The preceding examples have generally been described in the context of turbo block codes, where the indirect FEC decoding property being used for assessing operating conditions of the receiver device is the number of FEC iterations required to correct each block of FEC-encoded bits or symbols. However, a similar approach may be used for other FEC designs, including FEC designs that do not rely on iterative decoding.

In one example, a FEC scheme may comprise, or make use of, one or more Reed-Solomon (RS) decoding operations. Each RS decoding operation may operate on blocks of n q-bit symbols and, through the design of the FEC scheme, may correct up to t symbol errors. In this case, the indirect FEC decoding property used in the assessment of receiver operating conditions could comprise a statistical distribution of the number of symbol errors that were corrected each time the RS decoding operation was used.

In another example, a FEC scheme may comprise, or make use of, one or more staircase FEC decoding operations. In a staircase code, hard or soft bits are placed into blocks and arranged in a staircase configuration. Bose-Chaudhuri-Hocquenghem (BCH) parity bits are calculated across pairs of adjoining blocks, either from rows of bits (for blocks which are beside each other), or from columns of bits (for blocks arranged vertically). A continuous stream of blocks may pass through the FEC decoding such that, at any given time, the FEC decoding is operating on a particular group of blocks. The FEC decoding works from the oldest, least noisy blocks to the newest, noisiest blocks, with the BCH code being applied across rows in blocks that are beside each other, and then along columns for blocks arranged vertically. The sequence repeats until either (1) the syndromes in the oldest blocks of the group are all zero; or (2) a maximum number of iterations is reached. At this point, the oldest block exits the group, and the newest block enters. As with simple turbo block codes, the indirect FEC decoding property used in the assessment of receiver operating conditions could comprise a statistical distribution of the number of iterations required before a given block exits the group. Alternatively, the indirect FEC decoding property could consider the effort required for each iteration. For example, as errors between adjoining pairs of blocks are corrected, it is no longer necessary to run the BCH decoder for some rows or columns on subsequent iterations. The indirect FEC decoding property could comprise a statistical distribution of the number of BCH calls required to process each FEC block or the number of BCH calls in some amount of time. The variation in the rate of BCH calls could be counted directly with circuitry in the ASIC or inferred through metrics such as the current consumption of the ASIC or its temperature.

In cases where a FEC design comprises a combination of two or more FEC schemes, it is contemplated that the indirect FEC decoding property used in the assessment of receiver operation conditions could comprise a combination of statistical results associated with applying the two or more FEC schemes. For example, compression codes, such as those described by Oveis Gharan et al. in U.S. Pat. Application Publication No. 20190081730, may make use of iterative BCH decoding as well as intermediate RS error correction of the reconstructed syndrome bits. In this topology, the indirect FEC decoding property could include a probability density function (PDF) of the number of BCH iterations, as well as a PDF of the number of errors corrected by some combination of the RS decoders.

According to some examples, FEC statistics may be used to estimate how close the FEC is to failure. FEC overhead may be adapted to make the FEC more resilient to noise at the cost of rate. FEC parameters could also be chosen to trade off power usage versus noise tolerance if the proximity to failure is well understood.

It may be advantageous to determine information about how noise is distributed over the FEC blocks undergoing FEC decoding at a receiver device in a communication network. As will be described with respect to FIGS. 7-10, a measured FEC iteration distribution may be used to calculate an estimate of a noise distribution over a plurality of FEC blocks that are entering the FEC decoding.

A large population of bits may exhibit some average noise power. If that population is divided into smaller subsets, the average noise power of the bits within any given subset may differ somewhat from the average noise power of the entire population. In other words, there may be a range or distribution of noise power values across the subsets. Assuming uncorrelated white noise, a decrease in the number of bits within a given subset may result in a wider distribution of the noise power values. An increase in the number of bits within a given subset increases the averaging and may result in a narrower distribution of noise power values. The variation in noise power across finite subsets of a larger population may be referred to as numbers noise.

As previously described, a receiver device may output an average BER over a plurality of FEC blocks processed by FEC decoding during a specific period of time. From the average BER, an indication of the average NSR over the plurality of FEC blocks may be determined. If one were to measure the NSR value for each individual FEC block, it is expected that numbers noise would result in some variation in these values about the average NSR. For each value of NSR per FEC block, denoted $NSR_{BLK}$, there may exist a respective probability of occurrence of that NSR, denoted $P(NSR_{BLK})$. The variation in NSR values over a plurality of FEC blocks may be illustrated using a PDF.

FIG. 7 illustrates two example noise PDFs over a plurality of FEC blocks in accordance with some examples of the technology disclosed herein.

The dashed curve illustrates an example noise PDF, which will herein be referred to as a trial noise PDF for reasons that will later become apparent. Each point on the dashed curve represents the probability of a FEC block having a particular value $NSR_{BLK}$ of noise power, where $NSR_{BLK}$ is shown in linear units. According to one example, the trial noise PDF may be calculated using computer simulations performed on a plurality of simulated FEC blocks having a particular average NSR and assuming a particular noise distribution such as AWGN. Alternatively, the trial noise PDF could be calculated using analytic formulae or empirical models. The ranges of PDF values and $NSR_{BLK}$ values provided in FIG. 7 are for illustrative purposes only and should not be considered necessarily limiting. $NSR_{BLK}$ is shown in linear units.

The actual distribution of $NSR_{BLK}$ values over a plurality of FEC blocks may not be directly measured. However, as will now be described, an estimate of the $NSR_{BLK}$ distribution may be calculated based on a combination of measured FEC iteration data and reference FEC iteration data.

The relationship between a measured FEC iteration PMF over a plurality of FEC blocks and the noise distribution of those FEC blocks may be expressed by Equation 1:

$$P(N_{ITER}) = \Sigma_{NSR_{BLK}} P(N_{ITER}|NSR_{BLK}) \cdot P(NSR_{BLK}) \quad [1]$$

where $P(N_{ITER})$ denotes the probability of a number of FEC iterations $N_{ITER}$ being applied to any given FEC block of the plurality of FEC blocks; where $P(NSR_{BLK})$ denotes the probability of a NSR value $NSR_{BLK}$ being observed in any given FEC block of the plurality of FEC blocks; and where $P(N_{ITER}|NSR_{BLK})$ denotes the probability of a number of FEC iterations $N_{ITER}$ being applied to any given FEC block of a plurality of FEC blocks, under the condition that each FEC block in the plurality has the same noise power $NSR_{BLK}$. According to one example, values for the conditional probability $P(N_{ITER}|NSR_{BLK})$ may be calculated using computer simulations over a plurality of simulated FEC blocks filled with a well defined noise, such as uncorrelated AWGN. For example, for a given value of $NSR_{BLK}$, a corresponding FEC iteration distribution $P(N_{ITER}|NSR_{BLK})$ may be computed by applying FEC decoding to a plurality of FEC blocks, where each FEC block has the same given value of $NSR_{BLK}$, and where the distribution of noise is permitted to vary within each block according to an AWGN distribution. In this manner, a plurality of reference FEC iteration distributions $P(N_{ITER}|NSR_{BLK})$ may be generated, one for each value of $NSR_{BLK}$. According to other examples, each reference FEC iteration distribution $P(N_{ITER}|NSR_{BLK})$ may be generated through analytic calculations or through calibration under known noise conditions. The plurality of reference FEC iteration distributions may be represented by a series of PMFs.

FIG. 8 illustrates a series of reference FEC iteration PMFs. Each different PMF may be calculated, for example, from a different plurality of simulated FEC blocks exhibiting a different value of $NSR_{BLK}$. A comparison of the reference FEC iteration PMFs in FIG. 8 shows that an increase in the value of $NSR_{BLK}$ generally results in an increased probability that a higher number of FEC iterations $N_{ITER}$ will be applied during FEC decoding. In other words, under the assumption of AWGN, FEC blocks which exhibit a higher noise power are more likely to require a higher number of FEC iterations during FEC decoding. The $NSR_{BLK}$ values and the ranges of PMF values and $N_{ITER}$ values are for illustrative purposes only and should not be considered necessarily limiting.

According to Equation 1, the FEC iteration probability distribution $P(N_{ITER})$ may be calculated as a sum of the conditional FEC iteration probability distribution $P(N_{ITER}|NSR_{BLK})$ weighted by the noise probability distribution $P(NSR_{BLK})$ over all values of $NSR_{BLK}$. By combining a particular noise per block PDF, such as one of those shown in FIG. 7, with a series of reference FEC iteration PMFs, such as those shown in FIG. 8, it may be possible to predict the FEC iteration distribution that would result from that particular noise PDF.

FIG. 9 illustrates two example FEC iteration PMFs. The dashed curve illustrates a trial FEC iteration PMF which may be calculated according to Equation 1 using the trial noise PDF illustrated in FIG. 7 and the series of reference FEC iteration PMFs illustrated in FIG. 8. The trial FEC iteration PMF is effectively a weighted sum of the series of reference FEC iteration PMFs, where the weighting is defined by the trial noise PDF. The ranges of PMF values and $N_{ITER}$ values are for illustrative purposes only and should not be considered necessarily limiting.

The solid curve in FIG. 9 illustrates an example measured FEC iteration PMF, denoted $P(N_{ITER})$, determined from data output at a receiver device deployed in a communication network. According to some examples, an iterative process may be used to determine the trial noise PDF that produces the trial FEC iteration PMF that best matches the measured FEC iteration PMF. For example, it may be assumed that the noise probability $P(NSR_{BLK})$ follows one of a Gompertz, exponential, beta prime, $\chi^2$, gamma, or other distribution defined, for example, by one or more unknown constants $a_0$, $a_1, \ldots, a_N$, where N is an integer. This trial noise probability distribution, denoted $P(NSR_{BLK}; a_0, a_1, \ldots, a_N)$, may be assigned preliminary values of $a_0, a_1, \ldots, a_N$, and may be input into Equation 1 to generate a trial FEC iteration PMF, denoted $P'(N_{ITER}; a_0, a_1, \ldots, a_N)$. A nonlinear solver may be used to determine the values of $a_0, a_1, \ldots, a_N$ that minimize a difference between the trial distribution $P'(N_{ITER}; a_0, a_1, \ldots, a_N)$ and the measured distribution $P(N_{ITER})$, such as the mean square error, according to Equation 2:

$$\underset{a_0, a_1, \ldots, a_N}{\mathrm{argmin}} \{|\log(P(N_{ITER}) + \epsilon) - \log(P'(N_{ITER}; a_0, a_1, \ldots, a_N) + \epsilon)|^2\} \quad [2]$$

where $\epsilon$ is chosen to be smaller than the smallest values of $P(N_{ITER})$, thereby ensuring that the logarithm is real valued. In one example, $\epsilon = 10^{-12}$.

The concept of solving for the trial noise PDF that minimizes the difference between the trial FEC iteration PMF and the measured FEC iteration PMF is shown schematically through arrows in FIGS. 7 and 9. For each trial noise PDF, a corresponding trial FEC iteration PDF is calculated. The parameters $a_0, a_1, \ldots, a_N$ are adjusted and the calculation is repeated iteratively. With each iteration, the trial FEC iteration PMF may move closer to the measured FEC iteration PMF, as denoted by the arrows in FIG. 9. Simultaneously, the trial noise PDF may move closer to an accurate estimate of the true noise PDF, as denoted by the arrows in FIG. 7. Once the trial FEC iteration PMF is within a certain margin of error of the measured FEC iteration PMF, the solver may output the current values of $a_0, a_1, \ldots, a_N$. Assuming a particular type of noise distribution, the values of $a_0, a_1, \ldots, a_N$ output by the solver are used to calculate an estimated noise distribution, such as the solid curve shown in FIG. 7. In this manner, it may be possible to use a measured FEC iteration PMF to estimate a distribution of the noise in the FEC blocks entering the FEC decoding.

Figure 10:
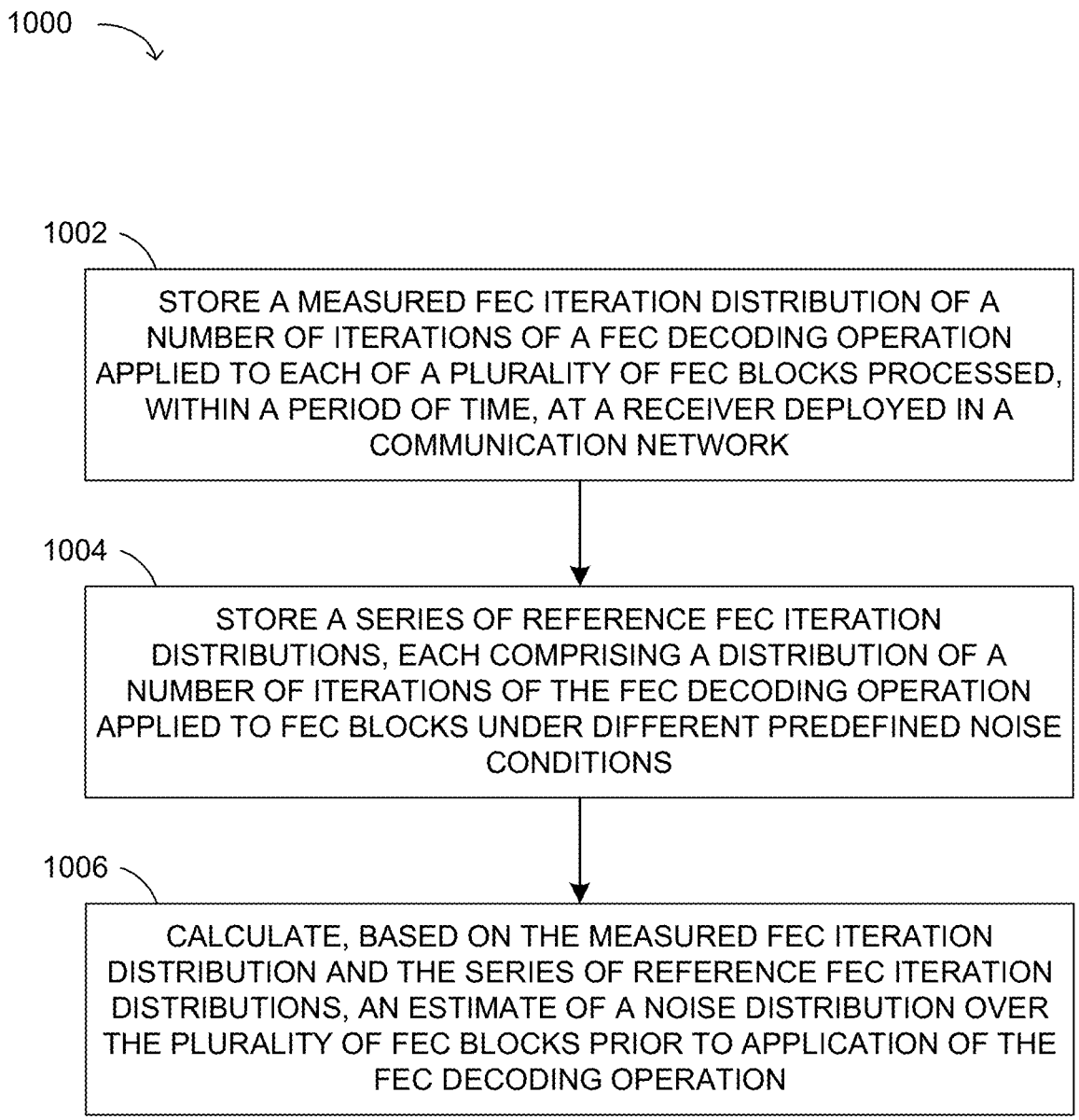
FIG. 10 illustrates an example method for calculating an estimate of a noise distribution over a plurality of FEC blocks based on a measured FEC iteration distribution in accordance with some examples of the technology disclosed herein.

FIG. 10 illustrates an example method 1000 for calculating an estimated noise distribution over a plurality of FEC blocks based on a measured FEC iteration distribution in accordance with some examples of the technology disclosed herein.

At 1002, a measured FEC iteration distribution is stored at an electronic device. For example, the measured FEC iteration distribution may be stored as part of the measured FEC data 216 in the ASIC 210 of the receiver device 202. Alternatively, the processor 304 of the controller device 302 may execute the code 310 which causes the processor 304 to store the measured FEC iteration distribution as part of the measured FEC data 216 in the memory 308 of the controller device 302. The measured FEC iteration distribution may comprise a statistical distribution of a number of iterations of a FEC decoding operation applied to each of a plurality of FEC blocks, within a period of time, at a receiver device deployed in a communication network. The measured FEC iteration distribution may be generated as a result of the FEC decoding 214 being implemented by the ASIC 210. The measured FEC iteration distribution may comprise one or more histograms, one or more PMFs, or both. In addition to storing the measured FEC iteration distribution, a measured noise power of the plurality of FEC blocks processed during the period of time may also be stored as part of the measured FEC data 216. The measured noise power may be represented, for example, by a NSR value or a SNR value.

At 1004, a series of reference FEC iteration distributions is stored at an electronic device. Each reference FEC iteration distribution comprises a distribution of a number of iterations of the FEC decoding operation applied to FEC blocks under different predefined noise conditions. For example, each different reference FEC iteration distribution may comprise a computer-simulated distribution of a number of iterations of the FEC decoding operation applied to simulated FEC blocks of a different plurality of simulated FEC blocks, where each simulated FEC block within a given plurality is constructed with well defined noise statistics. For example, FEC blocks within a given plurality may contain uncorrelated AWGN where all blocks have the same average noise power, and where each different plurality has a different average noise power. The series of reference FEC iteration distributions may be stored as part of the reference FEC data 218 in the ASIC 210 or a separate memory of the receiver device 202. In another example, the processor 304 of the controller device 302 may execute the code 310 which causes the processor 304 to store the series of reference FEC iteration distributions as part of the reference FEC data 218 in the memory 308 of the controller device 302. Each reference FEC iteration distribution may comprise, for example, a histogram or a PMF. The actions at 1004 are illustrated as being performed after the actions at 1002. However, the actions at 1004 may alternatively be performed prior to the actions at 1002, or in parallel to the actions at 1002.

At 1006, an estimate is calculated of the noise distribution over the plurality of FEC blocks prior to application of the FEC decoding operation. The estimated noise distribution may be calculated using the measured FEC iteration distribution stored at 1002 and the series of reference FEC iteration distributions stored at 1004. As described with respect to FIGS. 7-9, the estimated noise distribution may be calculated by determining the parameters of a trial noise distribution that minimize the error between a trial FEC iteration distribution and the measured FEC iteration distribution. For example, a trial FEC iteration distribution may be calculated by combining a series of reference FEC iteration PMFs stored at 1004 with a trial noise PDF, according to Equation 1. According to one example, the trial noise PDF follows a Gompertz distribution with particular values of $a_0$ and $a_1$. The trial noise distribution may be stored at an electronic device, for example, in the ASIC 210 or a separate memory of the receiver device 202, or in the memory 308 of the controller device 302. According to one example, the trial FEC iteration distribution may be calculated as a result of implementing the assessment processing 220. According to another example, the trial FEC iteration distribution may be calculated as a result of the processor 304 executing the assessment code 320. By applying a nonlinear solver to optimize a function, such as Equation 2, to the measured FEC iteration distribution and the trial FEC iteration distribution, it may be possible to solve for the optimum values of $a_0, a_1, \ldots, a_N$, thereby resulting in an estimate of the noise distribution over the plurality of FEC blocks processed at the receiver.

The ability to determine an estimate of the noise distribution over a plurality of FEC blocks entering the FEC decoding based on a measured FEC iteration distribution generated as a result of the FEC decoding may provide several advantages. For one, it is expensive to calculate $NSR_{BLK}$ directly inside a modem, as it requires an estimate of the noise on the individual bits within FEC blocks, and then calculation of the statistical properties of that noise. There are typically thousands of bits in each FEC block and this operation would need to be repeated over millions of FEC blocks to arrive at statistically significant results. In contrast, the proposed method 1000 for estimating the noise distribution is inexpensive because the number of iterations required to process a FEC block is known within a typical FEC implementation and the circuitry to obtain a histogram of the FEC iteration data requires a small number of operations which only need to be carried out once per FEC block. Furthermore, once an estimate of the noise distribution has been obtained, it may be relatively straightforward to obtain predictions of FEC performance under different noise loading conditions.

For example, given a measured FEC iteration PMF, the method 1000 may be used to estimate a noise PDF. It may be of interest to determine how an additional predefined noise contribution might be expected to affect the measured FEC iteration PMF. To make this prediction, the additional predefined noise contribution may be convolved with the estimated noise distribution to determine a modified noise distribution, according to Equation 3:

$$P_{MOD}(NSR_{BLK}) = P(NSR_{BLK}) * P_M(NSR_{BLK}) \qquad [3]$$

where $P(NSR_{BLK})$ denotes the measured noise PDF, $P_M(NSR_{BLK})$ denotes the additional predefined noise contribution, $P_{MOD}(NSR_{BLK})$ denotes the modified noise distribution, and where the asterisk * denotes convolution.

According to some examples, the modified noise distribution $P_{MOD}(NSR_{BLK})$ may be used as a test noise distribution for obtaining a prediction of the FEC iteration distribution. In general, based on the relationship defined in Equation 1, it may be possible to calculate a predicted FEC iteration distribution based on any test noise distribution by combining the test noise distribution with a series of reference FEC iteration distributions $P(N_{ITER}|NSR_{BLK})$. This modification of Equation 1 is shown in Equation 4:

$$P_{PRED}(N_{ITER}) = \Sigma_{NSR_{BLK}} P(N_{ITER}|NSR_{BLK}) \cdot P_{TEST}(NSR_{BLK}) \quad [4]$$

where $P_{PRED}(N_{ITER})$ denotes the predicted FEC iteration distribution and $P_{TEST}(NSR_{BLK})$ denotes the test noise distribution. In order to determine the predicted FEC iteration distribution $P_{PRED}(N_{ITER})$ resulting from the modified noise distribution $P_{MOD}(NSR_{BLK})$ calculated from Equation 3, Equation 4 could be applied under the condition $P_{TEST}(NSR_{BLK}) = P_{MOD}(NSR_{BLK})$.

The examples described herein generally assume that $P_{TEST}(NSR_{BLK}) = P_{MOD}(NSR_{BLK})$, where $P_{MOD}(NSR_{BLK})$ is calculated based on the estimated noise distribution obtained using the method 1000 and the modification resulting from Equation 3. However, other sources of $P_{TEST}(NSR_{BLK})$ are contemplated. For example, the test noise distribution $P_{TEST}(NSR_{BLK})$ may be estimated based on one or more of BER, mutual information, noise on groups of symbols entering a soft decoder, and the like. In another example, U.S. Pat. Application No. 20190190648 to Reimer et al. describes a method for estimating the noise on groups of received symbols. This method may be used, along with a model for the receiver DSP, to estimate $NSR_{BLK}$.

Figure 11:
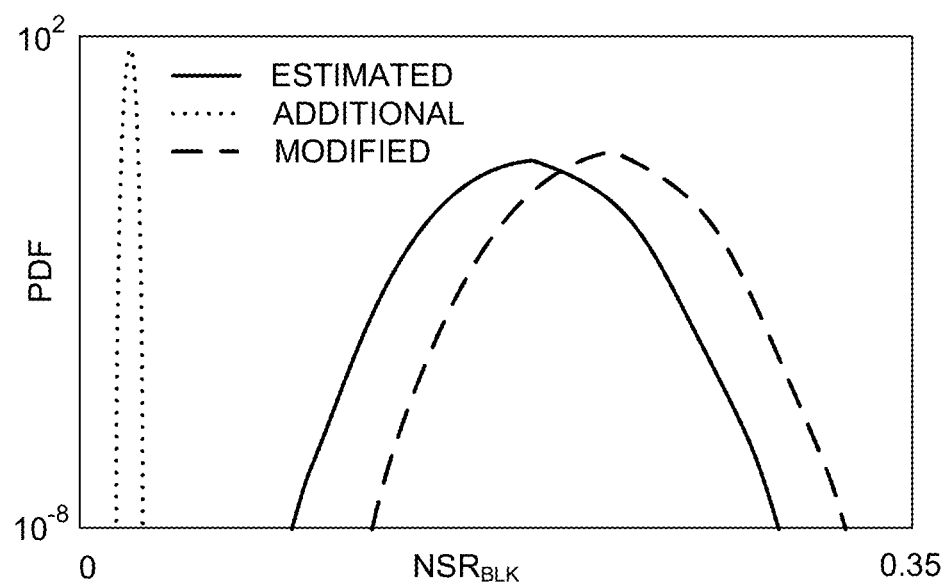
FIG. 11 illustrates an example estimated noise PDF over a plurality of FEC blocks, an example additional predefined noise PDF, and an example modified noise PDF in accordance with some examples of the technology disclosed herein.

FIG. 11 illustrates an example estimated noise PDF over a plurality of FEC blocks, an example additional predefined noise PDF, and an example modified noise PDF in accordance with some examples of the technology disclosed herein. The ranges of PDF values and $NSR_{BLK}$ values are for illustrative purposes only and should not be considered necessarily limiting. $NSR_{BLK}$ is shown in linear units.

The solid curve represents the estimated noise PDF. The dotted curve represents the additional predefined noise PDF. The dashed curve represents the modified noise PDF which results from the application of Equation 3 to the solid curve and the dotted curve.

Figure 12:
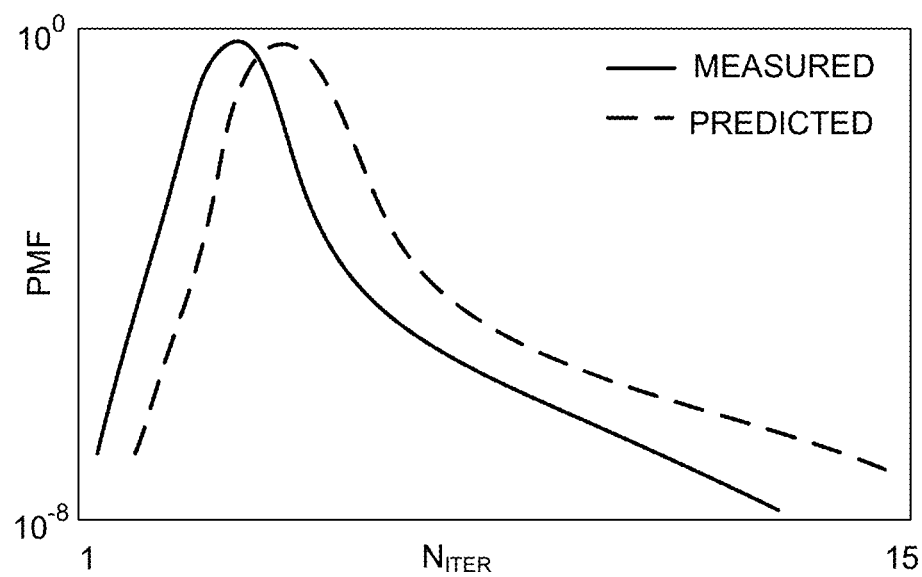
FIG. 12 illustrates an example measured FEC iteration PMF and an example predicted FEC iteration PMF resulting from the additional predefined noise PDF applied in FIG. 11, in accordance with some examples of the technology disclosed herein.

FIG. 12 illustrates an example measured FEC iteration PMF and an example predicted FEC iteration PMF resulting from the additional predefined noise PDF applied in FIG. 11, in accordance with some examples of the technology disclosed herein. The ranges of PMF values and $N_{ITER}$ values are for illustrative purposes only and should not be considered necessarily limiting.

The solid curve represents the measured FEC iteration PMF from which the estimated noise PDF in FIG. 11 was calculated, according to the method 1000. The dashed curve represents the predicted FEC iteration PMF that is expected as a result of the modified noise PDF shown in FIG. 11. The predicted FEC iteration PMF is calculated by applying Equation 1 to the modified noise distribution. As is apparent from FIGS. 11 and 12, the introduction of the additional predefined noise contribution results in an increased likelihood of higher noise power, and an increased likelihood of higher numbers of FEC iterations. The ability to predict changes in the FEC iteration distribution based on changes in the noise distribution may prove highly valuable. For example, a SLA may require that the FER does not exceed $10^{-12}$. Given a current measured FEC iteration distribution measured from a receiver device, and the resultant estimate of the noise distribution, an administrator may determine how much additional noise can be tolerated while still maintaining the required maximum FER. All this may be done through calculations, rather than actually testing the system with real noise. Moreover, the accuracy of such calculations may be high because the noise distribution estimated using the method 1000 does not rely on any assumptions about the origin of the noise entering the FEC decoding or its statistical properties.

Figure 13:
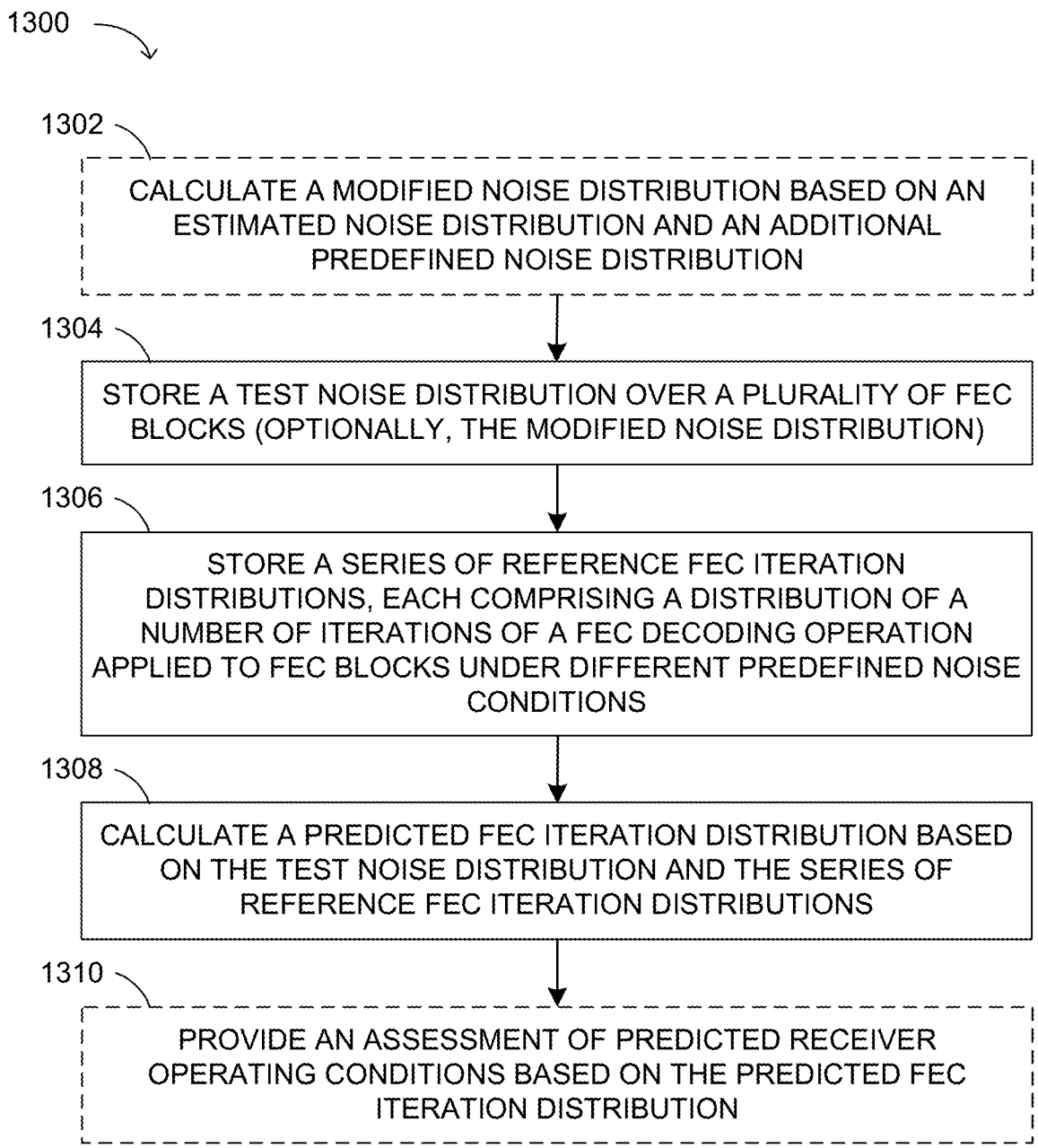
FIG. 13 illustrates an example method for calculating a predicted FEC iteration distribution based on a test noise distribution, in accordance with some examples of the technology disclosed herein.

FIG. 13 illustrates an example method 1300 for calculating a predicted FEC iteration distribution based on a test noise distribution, in accordance with some examples of the technology disclosed herein.

At 1302, a modified noise distribution is optionally calculated over a plurality of FEC blocks based on an estimated noise distribution and an additional predefined noise distribution. For example, in accordance with Equation 3, an additional predefined noise contribution $P_M(NSR_{BLK})$ may be convolved with an estimated noise distribution $P(NSR_{BLK})$ to determine a modified noise distribution $P_{MOD}(NSR_{BLK})$. The estimated noise distribution $P(NSR_{BLK})$ may have been calculated according to the method 1000. According to one example, the modified noise distribution may be calculated as a result of implementing the assessment processing 220. According to another example, the modified noise distribution may be calculated as a result of the processor 304 executing the assessment code 320.

At 1304, a test noise distribution over a plurality of FEC blocks is stored at an electronic device. For example, the test noise distribution may be stored at an electronic device, for example, in the ASIC 210 or a separate memory of the receiver device 202, or the memory 308 of the controller device 302, or some combination thereof. According to some examples, the test noise distribution may comprise the modified noise distribution $P_{MOD}(NSR_{BLK})$ calculated at 1302.

At 1306, a series of reference FEC iteration distributions is stored at an electronic device. As described with respect to the method 1000, each reference FEC iteration distribution may comprise a distribution of a number of iterations of a FEC decoding operation applied to FEC blocks under different predefined noise conditions. According to some examples, the series of reference FEC iteration distributions $P(N_{ITER}|NSR_{BLK})$ may have been generated using computer simulations, analytic calculations, or calibration using real hardware. The actions at 1306 are illustrated as being performed after the actions at 1304. However, the actions at 1306 may alternatively be performed prior to the actions at 1304, or in parallel to the actions at 1304.

At 1308, a predicted FEC iteration distribution may be calculated based on the test noise distribution stored at 1304 and the series of reference FEC iteration distributions stored at 1306. For example, in accordance with Equation 4, the test noise distribution $P_{TEST}(NSR_{BLK})$ stored at 1304 may be combined with the series of reference FEC iteration distributions $P(N_{ITER}|NSR_{BLK})$ stored at 1306 in order to obtain a predicted FEC iteration distribution $P_{PRED}(N_{ITER})$. According to one example, the predicted FEC iteration distribution may be calculated as a result of implementing the assessment processing 220. According to another example, the predicted FEC iteration distribution may be calculated as a result of the processor 304 executing the assessment code 320.

At 1310, an assessment of predicted receiver operating conditions may optionally be provided based on the predicted FEC iteration distribution calculated at 1308. For example, where the test noise distribution stored at 1304 is the modified noise distribution calculated at 1302, the assessment may comprise an indication of a predicted change in margin as a result of the additional predefined noise. In another example, the assessment may comprise an indication of whether or not the predicted FEC iteration distribution satisfies certain requirements of the communication network. According to some examples, the assessment may involve one or more thresholds or masks, as described with respect to the method 600. According to one example, the assessment is performed as a result of implementing the assessment processing 220. According to another example, the assessment is performed as a result of the processor 304 of the controller device 302 executing the assessment code 320. The assessment may be provided by storing the assessment at an electronic device, for example, in the ASIC 210 or a separate memory of the receiver device 202, or the memory 308 of the controller device 302. The assessment may additionally be provided by displaying results of the assessment on a display screen of an electronic device.

Although not explicitly shown in FIG. 13, the assessment provided at 1310 may be used to make decisions regarding changes in the communication network. For example, one may contemplate a scenario in which a particular change in a network is expected to result in the modified noise distribution as calculated at 1302. If an assessment result provided at 1310 indicates that the predicted FEC iteration distribution calculated at 1308 is in compliance with certain network requirements, an administrator may make a decision to apply the particular change in the network. On the other hand, an assessment result provided at 1310 indicates that the predicted FEC iteration distribution calculated at 1308 is no longer in compliance with certain network requirements, the administrator may make a decision not to apply the particular change in the network. Changes in the network could include changes to various network parameters, such as channel power, choice of modulation format, FED coding, carrier recovery parameters or other modem parameters, routing of a channel or its neighbours, and the like.

The preceding examples described with respect to FIGS. 7-13 and Equations 1-4 generally involve an anticipated relationship between the noise distribution of the FEC blocks and the observed FEC iteration distribution. For example, the method 1000 uses a measured FEC iteration distribution to calculate an estimate of the noise distribution of the FEC blocks based on the anticipated relationship defined in Equation 1. It is contemplated that anticipated relationships may be established between the noise distribution of the FEC blocks and FEC statistics other than the FEC iteration distribution. For example, an equation similar to Equation 1 may define an anticipated relationship between the noise distribution of the FEC blocks and indirect FEC decoding property such as heat, temperature, current, voltage, active clock cycles, idle clock cycles, activity of parallel engines, or activity of pipeline stages. In this manner, it may be possible to start from a measured distribution of a particular FEC decoding property, and solve for the statistical properties of the noise entering the FEC decoding.

The scope of the claims should not be limited by the details set forth in the examples, but should be given the broadest interpretation consistent with the description as a whole.

What is claimed:

1. An electronic device comprising:
   circuitry configured to store a measured forward error correction (FEC) iteration distribution of a number of iterations of a FEC decoding operation applied to each of a plurality of FEC blocks processed, within a period of time, at a receiver device deployed in a communication network, each FEC block consisting of FEC-encoded bits or symbols encoded using a FEC encoding operation corresponding to the FEC decoding operation; and
   circuitry configured to store a series of reference FEC iteration distributions, each reference FEC iteration distribution comprising a distribution of a number of iterations of the FEC decoding operation applied to FEC blocks under different predefined noise conditions; and
   circuitry configured to calculate, based on the measured FEC iteration distribution and the series of reference FEC iteration distributions, an estimate of a noise distribution over the plurality of FEC blocks prior to application of the FEC decoding operation.

2. The electronic device as claimed in claim 1, further comprising
   circuitry configured to calculate a trial FEC iteration distribution by combining a trial noise distribution having trial parameters with the series of reference FEC iteration distributions; and
   circuitry configured to calculate the estimate of the noise distribution by determining the trial parameters which minimize a difference between the trial FEC iteration distribution and the measured FEC iteration distribution.

3. The electronic device as claimed in claim 1, further comprising
   circuitry configured to calculate a modified noise distribution based on the estimate of the noise distribution and an additional predefined noise distribution; and
   circuitry configured to calculate a predicted FEC iteration distribution based on the modified noise distribution and the series of reference FEC iteration distributions.

4. The electronic device as claimed in claim 3, further comprising
   circuitry configured to provide an assessment of a predicted change in operating conditions of the receiver device based on the predicted FEC iteration distribution; and
   circuitry configured to initiate a change in one or more parameters of the communication network based on the assessment.

5. An electronic device comprising:
   circuitry configured to store a test noise distribution over a plurality of FEC blocks, each FEC block consisting of FEC-encoded bits or symbols encoded using a FEC encoding operation;
   circuitry configured to store a series of reference FEC iteration distributions, each reference FEC iteration distribution comprising a distribution of a number of iterations of a FEC decoding operation applied to FEC blocks under different predefined noise conditions, the FEC decoding operation corresponding to the FEC encoding operation; and
   circuitry configured to calculate a predicted FEC iteration distribution based on the test noise distribution and the series of reference FEC iteration distributions.

6. The electronic device as claimed in claim 5, further comprising
   circuitry configured to provide an assessment of predicted operating conditions of a receiver device based on the predicted FEC iteration distribution.

7. The electronic device as claimed in claim 6, further comprising circuitry configured to initiate a change in one or more parameters of a communication network based on the assessment.

* * * * *